US011933738B2

(12) United States Patent
Iwabuchi

(10) Patent No.: US 11,933,738 B2
(45) Date of Patent: Mar. 19, 2024

(54) MARKING SYSTEM, DIAGNOSIS SUPPORT APPARATUS, DIAGNOSIS SUPPORT METHOD, AND STORAGE MEDIUM STORING DIAGNOSIS SUPPORT PROGRAM

(71) Applicant: Keyence Corporation, Osaka (JP)

(72) Inventor: Osamu Iwabuchi, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 416 days.

(21) Appl. No.: 17/176,197

(22) Filed: Feb. 16, 2021

(65) Prior Publication Data
US 2021/0287355 A1 Sep. 16, 2021

(30) Foreign Application Priority Data
Mar. 16, 2020 (JP) .................................. 2020-045252

(51) Int. Cl.
*G01N 21/88* (2006.01)
*B23K 26/03* (2006.01)
(Continued)

(52) U.S. Cl.
CPC ....... *G01N 21/8851* (2013.01); *B23K 26/032* (2013.01); *B23K 26/082* (2015.10);
(Continued)

(58) Field of Classification Search
CPC .............. G01N 21/8851; B23K 26/032; B23K 26/082; G06T 7/0004; G06T 2207/30144
See application file for complete search history.

(56) References Cited

U.S. PATENT DOCUMENTS 7,243,045 B2 * 7/2007 Uwatoko ............... G03G 15/55
399/9
8,487,992 B2 * 7/2013 Seri .......................... G06T 1/60
348/133
(Continued)

FOREIGN PATENT DOCUMENTS

JP 9-220686 A 8/1997
JP 2011050978 A * 3/2011

OTHER PUBLICATIONS

JP 2011-050978 A (Kato, Daki) Mar. 17, 2011 [retrieved on Nov. 17, 2023]. Retrieved from Foreign Image and Text database, translation by Clarivate Analytics. (Year: 2011).*
(Continued)

*Primary Examiner* — John J Norton
(74) *Attorney, Agent, or Firm* — Kilyk & Bowersox, P.L.L.C.

(57) ABSTRACT

A marking system includes: a whole camera that generates a captured image; a pass/fail determination section that determines pass/fail of printing using the captured image; a history storage section that stores a plurality of determination results including an NG determination result, the captured image, and state information of a laser marker in association with each other; a display section that displays at least one of a first display area for displaying the plurality of determination results and a second display area for displaying the captured image; a receiving section that selects either the NG determination result or the captured image; and a control section that displays state information, associated with the NG determination result or the captured image selected via the receiving section, among a plurality of types of the state information on the display section.

9 Claims, 26 Drawing Sheets

(51) Int. Cl.
*B23K 26/082* (2014.01)
*B41F 33/00* (2006.01)
*G06T 7/00* (2017.01)
*G06T 7/521* (2017.01)

(52) U.S. Cl.
CPC ........ *B41F 33/0036* (2013.01); *G06T 7/0002* (2013.01); *G06T 7/0004* (2013.01); *G06T 7/521* (2017.01); *G06T 2207/30144* (2013.01)

(56) References Cited

U.S. PATENT DOCUMENTS

| | | | | |
|---|---|---|---|---|
| 8,934,704 | B2* | 1/2015 | Hirano | G06T 7/001 |
| | | | | 382/148 |
| 9,608,397 | B2* | 3/2017 | Sato | H01S 3/094053 |
| 9,773,304 | B2* | 9/2017 | Mayumi | H04N 23/56 |
| 2017/0358069 | A1* | 12/2017 | Sagisaka | G01N 21/8851 |
| 2018/0350060 | A1* | 12/2018 | Nakao | G06T 7/194 |

OTHER PUBLICATIONS

U.S. Appl. No. 17/102,566, filed Nov. 24, 2020 (118 pages).

* cited by examiner

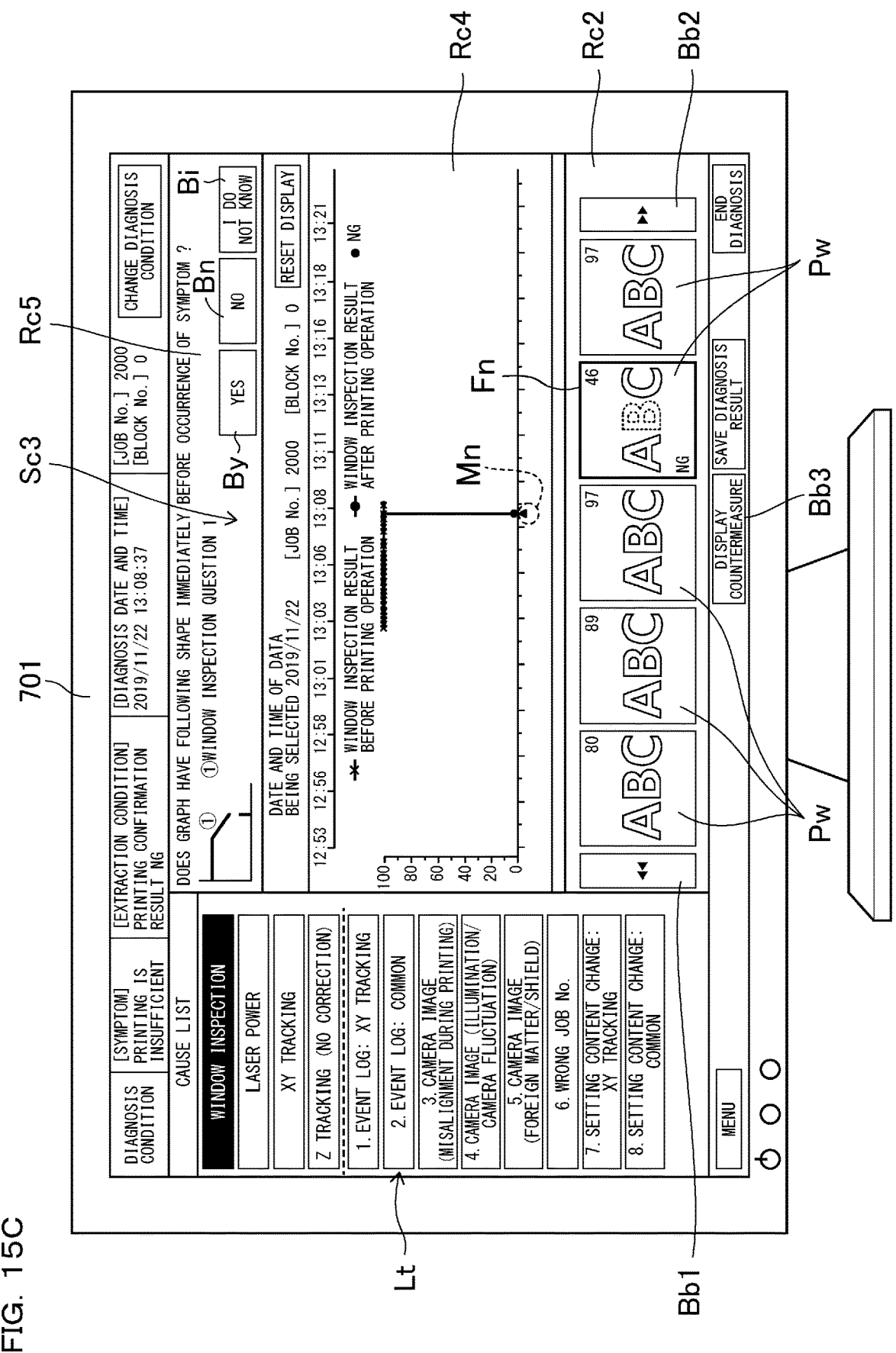

FIG. 16

| CAUSE CLASSIFICATION | CAUSE TYPE | CAUSE NAME | DISPLAY/NON-DISPLAY AND PRIORITY ORDER ||||||| 
| | | | 1 THERE IS NO PRINTING | 2 PRINTING IS INSUFFICIENT | 3 PRINTING IS LIGHT/DARK/UNEVEN | 4 PRINTING IS DISTURBED | 5 PRINTING CONTENT IS WRONG | 6 PRINTING POSITION IS MISALIGNED | 7 PRINTING EVALUATION IS LOW |
|---|---|---|---|---|---|---|---|---|---|
| LASER MARKER | SUPERFICIAL CAUSE | LASER POWER | B | B | B | × | × | × | B |
| LASER MARKER | SUPERFICIAL CAUSE | WINDOW INSPECTION | B | A | A | × | × | × | A |
| CONVEYING DEVICE/JIG/WORKPIECE | SUPERFICIAL CAUSE | Z TRACKING | A | C | A | A | A | × | A |
| CONVEYING DEVICE/JIG/WORKPIECE | SUPERFICIAL CAUSE | XY TRACKING | B | B | B | A | A | × | A |
| HUMAN/PLC | ROOT CAUSE | EVENT LOG | A | A | C | C | × | × | C |
| HUMAN/PLC | ROOT CAUSE | WRONG JOB No. | B | C | C | × | B | A | C |
| HUMAN/PLC | ROOT CAUSE | SETTING CONTENT CHANGE | C | C | C | C | C | A | C |
| OTHER ENVIRONMENT CAUSE | ROOT CAUSE | CAMERA IMAGE (MISALIGNMENT DURING PRINTING) | C | A | B | B | B | C | A |
| OTHER ENVIRONMENT CAUSE | ROOT CAUSE | CAMERA IMAGE (ILLUMINATION/CAMERA FLUCTUATION) | C | A | B | B | B | C | A |
| OTHER ENVIRONMENT CAUSE | ROOT CAUSE | CAMERA IMAGE (FOREIGN MATTER/SHIELD) | C | A | B | B | B | C | A |
| OTHER ENVIRONMENT CAUSE | ROOT CAUSE | OTHERS | C | C | C | C | C | C | C |

FIG. 17

| | 2<br>PRINTING IS INSUFFICIENT | 4<br>PRINTING IS DISTURBED |
|---|---|---|
| LASER POWER | B | × |
| WINDOW INSPECTION | A | × |
| Z TRACKING | C | A |
| XY TRACKING | B | A |
| EVENT LOG | A | C |
| WRONG JOB No. | C | × |
| SETTING CONTENT CHANGE | C | C |
| CAMERA IMAGE (MISALIGNMENT DURING PRINTING) | A | B |
| CAMERA IMAGE (ILLUMINATION/CAMERA FLUCTUATION) | A | B |
| CAMERA IMAGE (FOREIGN MATTER/SHIELD) | A | B |
| OTHERS | C | C |

| | |
|---|---|
| LASER POWER | B |
| WINDOW INSPECTION | A |
| Z TRACKING | A |
| XY TRACKING | A |
| EVENT LOG | A |
| WRONG JOB No. | C |
| SETTING CONTENT CHANGE | C |
| CAMERA IMAGE (MISALIGNMENT DURING PRINTING) | A |
| CAMERA IMAGE (ILLUMINATION/CAMERA FLUCTUATION) | A |
| CAMERA IMAGE (FOREIGN MATTER/SHIELD) | A |
| OTHERS | C |

| | |
|---|---|
| WINDOW INSPECTION | A |
| Z TRACKING | A |
| XY TRACKING | A |
| LASER POWER | B |
| EVENT LOG | A |
| CAMERA IMAGE (MISALIGNMENT DURING PRINTING) | A |
| CAMERA IMAGE (ILLUMINATION/CAMERA FLUCTUATION) | A |
| CAMERA IMAGE (FOREIGN MATTER/SHIELD) | A |
| WRONG JOB No. | C |
| SETTING CONTENT CHANGE | C |
| OTHERS | C |

FIG. 20
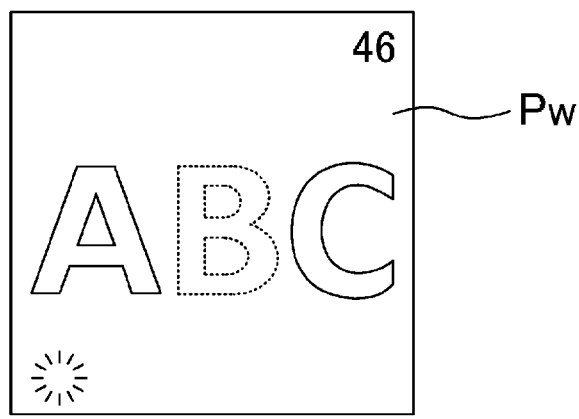
DETERMINATION CORRECTION
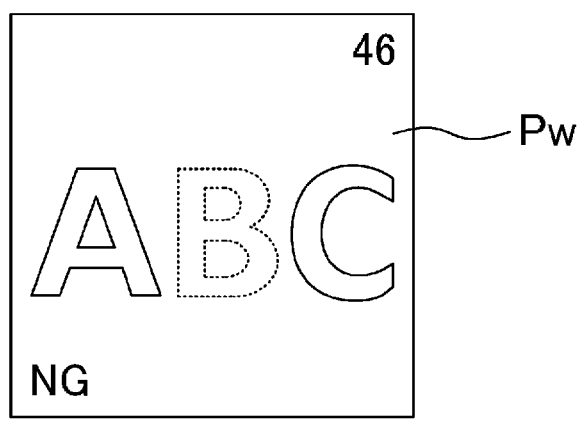

MARKING SYSTEM, DIAGNOSIS SUPPORT APPARATUS, DIAGNOSIS SUPPORT METHOD, AND STORAGE MEDIUM STORING DIAGNOSIS SUPPORT PROGRAM

CROSS-REFERENCE TO RELATED APPLICATIONS

The present application claims foreign priority based on Japanese Patent Application No. 2020-045252, filed Mar. 16, 2020, the contents of which are incorporated herein by reference.

BACKGROUND OF THE INVENTION

1. Field of the Invention

The technique disclosed herein relates to a marking system including a laser marker, a diagnosis support apparatus, a diagnosis support method, and a diagnosis support program thereof, and a storage medium for storing the diagnosis support program.

2. Description of Related Art

Conventionally, there is known a laser marker including a camera for confirmation of a printing state.

For example, Japanese Patent Laid-Open No. H9-220686 discloses a laser marker (laser printing apparatus) including an imaging optical system coaxial with a laser light emission axis of a laser head and an imaging camera that captures a printed surface of a workpiece (printed object) through the imaging optical system.

The laser marker disclosed in Japanese Patent Laid-Open No. H9-220686 captures the printed surface after printing and performs image processing on an imaging signal thereof to determine the pass/fail of laser printing.

This laser marker can capture an image of the printed surface immediately after laser printing without moving the workpiece by making the imaging optical system to be coaxial with the laser light emission axis.

However, even if a printing defect is found using a captured image, for example, as described in Japanese Patent Laid-Open No. H9-220686, it is difficult to identify a cause that leads to the printing defect only by visually recognizing the captured image. If the cause is not identified, there is a problem in terms of setting and measures for improving the symptom.

Further, it is required to visually recognize the captured image as appropriate in order for a user to diagnose the printing defect. However, when there are a large number of workpieces that have undergone printing, there are also a large number of captured images indicating the pass/fail of laser printing, and thus, it becomes difficult to extract a desired captured image.

SUMMARY OF THE INVENTION

The technique disclosed herein has been made in view of such points, and an object thereof is to improve the usability related to diagnosis of a printing defect by facilitating both extraction of a captured image indicating the pass/fail of laser printing and identification of the cause of the printing defect using the captured image.

According to one embodiment of the present disclosure, a marking system including a laser marker which includes: an excitation light generation section that generates excitation light; a laser light output section that generates laser light based on the excitation light generated by the excitation light generation section and emits the laser light; and a laser light scanning section that irradiates a workpiece with the laser light emitted from the laser light output section and two-dimensionally scans a surface of the workpiece.

Further, according to the embodiment of the present disclosure, the marking system includes: an image acquisition section that captures an image of the workpiece in an area scanned two-dimensionally by the laser light scanning section to generate captured images including at least a part of the workpiece; a pass/fail determination section that determines pass/fail of printing applied to the workpiece using the captured images acquired by the image acquisition section; a history storage section that stores a plurality of determination results including at least an NG determination result among determination results obtained by the pass/fail determination section, the captured images used for acquisition of each of the determination results, and a plurality of pieces of state information during the acquisition of each of the determination results among a plurality of types of state information indicating states of the laser marker as history information in a time-series order in a state of being associated with each other; a display section that displays at least one of a first display area for displaying the plurality of determination results stored in the history storage section in a time-series order and a second display area for displaying the captured images respectively corresponding to the plurality of determination results in a time-series order; a receiving section that receives an operation of selecting one or more of any of the NG determination result displayed in the first display area and the captured image displayed in the second display area and corresponding to the NG determination result; and a control section that controls the display section such that at least the state information associated with the NG determination result or the captured image selected via the receiving section is displayed on the display section among the plurality of types of state information.

Here, the "NG determination result" refers to a determination result, which indicates that printing is not favorable, among the determination results obtained by the pass/fail determination section. For example, the NG determination result is obtained when a printing defect occurs on the workpiece.

With this configuration, the history storage section stores the NG determination result and the captured image in association with each other, thereby facilitating the extraction of the captured image where the printing defect has occurred. According to the embodiment, state information associated with an NG determination result or a captured image can be displayed by designating the NG determination result displayed on the display section or the captured image corresponding to the NG determination result. As a result, a user can visually recognize the state information when printing has not been favorably performed, and the diagnosis of the printing defect can be facilitated. That is, the above configuration contributes to identification of the cause of the printing defect.

In this manner, according to the embodiment of the present disclosure, it is possible to facilitate the extraction of a captured image indicating the pass/fail of laser printing and identification of the cause of the printing defect using the captured image, and further, to improve the usability related to the diagnosis of the printing defect.

According to another embodiment of the present disclosure, it may be configured such that the display section displays both the first display area and the second display area, and the control section controls the display section such that a display content of one of the first display area and the second display area is changed in conjunction with a change of a display content of the other.

With this configuration, the marking system according to the present disclosure links a display mode of the first display area and a display mode of the second display area with each other. As a result, it is possible to further improve the usability at the time of diagnosing the printing defect.

According to still another embodiment of the present disclosure, the history storage section may store at least a plurality of OK determination results among the determination results obtained by the pass/fail determination section, the captured images used for acquisition of each of the OK determination results, and a plurality of pieces of state information during the acquisition of each of the OK determination results among the plurality of pieces of state information as history information in a time-series order in a state of being associated with each other.

Here, the "OK determination result" refers to a determination result, which indicates that printing is favorable, among the determination results obtained by the pass/fail determination section. For example, when the printing defect has not occurred on the workpiece, the pass/fail determination section makes an OK determination.

With this configuration, the user can compare a captured image and state information according to the NG determination result with a captured image and state information according to the OK determination result by using the marking system according to the present disclosure. As a result, it is possible to more easily extract the captured image and to more easily identify the cause of the printing defect.

According to still another embodiment of the present disclosure, the control section may control the display section such that state information associated with a determination result other than the NG determination result designated via the receiving section among the plurality of types of state information or state information associated with a captured image other than the captured image designated via the receiving section is displayed on the display section.

With this configuration, the user can compare the state information associated with the NG determination result or the captured image designated via the receiving section with the state information associated with the determination result other than the designated determination result (for example, the OK determination result) or the captured image. As a result, it is possible to further improve the usability at the time of diagnosing the printing defect.

According to still another embodiment of the present disclosure, the control section may display pieces of state information on the display section in a time-series order regarding at least one type of the plurality of types of state information, associated with the NG determination result or the captured image when the NG determination result or the captured image is designated via the receiving section.

With this configuration, the user can visually recognize a change over time in the state information. As a result, it is possible to more easily identify the cause of the printing defect.

According to still another embodiment of the present disclosure, the control section may display at least one of a line graph, a bar graph, and a scatter diagram illustrating a change over time in the state information on the display section regarding at least one type of the plurality of types of state information when the NG determination result or the captured image is designated via the receiving section.

With this configuration, the user can easily visually recognize the change over time in the state information. As a result, it is possible to more easily identify the cause of the printing defect.

According to still another embodiment of the present disclosure, it may be configured such that the marking system includes: a housing that includes at least the laser light output section and the laser light scanning section provided inside; a power monitor that detects an output of the laser light output from the laser light output section; a distance measuring mechanism that is provided inside or outside the housing and measures a distance from the housing to the workpiece; an image processing section that identifies a position of the workpiece when viewed along an area that is two-dimensionally scanned by the laser light scanning section on the captured image generated by the image acquisition section; a light-transmissive window which is provided in the housing of the laser marker and through which the laser light two-dimensionally scanned by the laser light scanning section passes; and a stain detection section that detects a stain in the light-transmissive window, and the history storage section stores, as the plurality of types of state information, at least one or more of the output of the laser light detected by the power monitor, the distance to the workpiece measured by the distance measuring mechanism, the position of the workpiece identified by the image processing section, and the stain detected by the stain detection section.

With this configuration, the marking system according to the present disclosure can use a wide variety of information as the state information. As a result, it is possible to more thoroughly identify the cause of the printing defect.

According to still another embodiment of the present disclosure, it may be configured such that the receiving section receives an operation of correcting a determination result obtained by the pass/fail determination section and the control section controls the display section such that the correction using the receiving section is reflected.

With this configuration, the determination result can be corrected when the user discovers a printing defect that has been overlooked by the pass/fail determination section, and the display content of the display section can be changed to reflect the correction. As a result, it is possible to further improve the usability at the time of diagnosing the printing defect.

One embodiment of the present disclosure relates to a diagnosis support apparatus that supports diagnosis of a printing defect occurring on a workpiece during printing by a laser marker which includes: an excitation light generation section that generates excitation light; a laser light output section that generates laser light based on the excitation light generated by the excitation light generation section and emits the laser light; a laser light scanning section that irradiates the workpiece with the laser light emitted from the laser light output section and two-dimensionally scans the workpiece surface; an image acquisition section that captures an image of the workpiece in an area scanned two-dimensionally by the laser light scanning section to generate captured images including at least a part of the workpieces; and a pass/fail determination section that determines pass/fail of printing applied to the workpiece using the captured images acquired by the image acquisition section.

Further, according to the embodiment of the present disclosure, the diagnosis support apparatus includes: a history storage section that stores a plurality of determination results including at least an NG determination result among determination results obtained by the pass/fail determination section, the captured images used for acquisition of each of the determination results, and a plurality of pieces of state information during the acquisition of each of the determination results among a plurality of types of state information indicating states of the laser marker as history information in a time-series order in a state of being associated with each other; a display section that displays at least one of a first display area for displaying the plurality of determination results stored in the history storage section in a time-series order and a second display area for displaying the captured images respectively corresponding to the plurality of determination results in a time-series order; a receiving section that receives an operation of selecting one or more of any of the NG determination result displayed in the first display area and the captured image displayed in the second display area and corresponding to the NG determination result; and a control section that controls the display section such that the state information associated with the NG determination result or the captured image designated via the receiving section is displayed on the display section among the plurality of types of state information.

With this configuration, it is possible to facilitate the extraction of a captured image indicating the pass/fail of laser printing and identification of the cause of the printing defect using the captured image, and further, to improve the usability related to the diagnosis of the printing defect.

One embodiment of the present disclosure relates to a diagnosis support method for supporting diagnosis of a printing defect occurring on a workpiece during printing by a laser marker using a computer provided with: a history storage section that stores history information; a display section that displays information to a user; a receiving section that receives an operation by the user; and a control section that controls the display section, the laser marker including: an excitation light generation section that generates excitation light; a laser light output section that generates laser light based on the excitation light generated by the excitation light generation section and emits the laser light; a laser light scanning section that irradiates the workpiece with the laser light emitted from the laser light output section and two-dimensionally scans the workpiece surface; an image acquisition section that captures an image of the workpiece in an area scanned two-dimensionally by the laser light scanning section to generate captured images including at least a part of the workpieces; and a pass/fail determination section that determines pass/fail of printing applied to the workpiece using the captured images acquired by the image acquisition section.

Further, according to the embodiment of the present disclosure, the diagnosis support method includes: a step of causing the history storage section to store a plurality of determination results including at least an NG determination result among determination results obtained by the pass/fail determination section, the captured images used for acquisition of each of the determination results, and a plurality of pieces of state information during the acquisition of each of the determination results among a plurality of types of state information indicating states of the laser marker as history information in a time-series order in a state of being associated with each other; a step of causing the display section to display at least one of a first display area for displaying the plurality of determination results stored in the history storage section in a time-series order and a second display area for displaying the captured images respectively corresponding to the plurality of determination results in a time-series order; a step of causing the receiving section to receive an operation of selecting one or more of any of the NG determination result displayed in the first display area and the captured image displayed in the second display area and corresponding to the NG determination result; and a step of causing the control section to control the display section such that the state information associated with the NG determination result or the captured image designated via the receiving section is displayed on the display section among the plurality of types of state information.

With this method, it is possible to facilitate the extraction of a captured image indicating the pass/fail of laser printing and identification of the cause of the printing defect using the captured image, and further, to improve the usability related to the diagnosis of the printing defect.

One embodiment of the present disclosure relates to a diagnosis support program executed by a computer, provided with: a history storage section that stores history information; a display section that displays information to a user; a receiving section that receives an operation by the user; and a control section that controls the display section, to support diagnosis of a printing defect occurring on a workpiece during printing by a laser marker including: an excitation light generation section that generates excitation light; a laser light output section that generates laser light based on the excitation light generated by the excitation light generation section and emits the laser light; a laser light scanning section that irradiates the workpiece with the laser light emitted from the laser light output section and two-dimensionally scans the workpiece surface; an image acquisition section that captures an image of the workpiece in an area scanned two-dimensionally by the laser light scanning section to generate captured images including at least a part of the workpieces; and a pass/fail determination section that determines pass/fail of printing applied to the workpiece using the captured images acquired by the image acquisition section.

Further, according to the embodiment of the present disclosure, the diagnosis support program causes the computer to execute: a step of causing the history storage section to store a plurality of determination results including at least an NG determination result among determination results obtained by the pass/fail determination section, the captured images used for acquisition of each of the determination results, and a plurality of pieces of state information during the acquisition of each of the determination results among a plurality of types of state information indicating states of the laser marker as history information in a time-series order in a state of being associated with each other; a step of causing the display section to display at least one of a first display area for displaying the plurality of determination results stored in the history storage section in a time-series order and a second display area for displaying the captured images respectively corresponding to the plurality of determination results in a time-series order; a step of causing the receiving section to receive an operation of selecting one or more of any of the NG determination result displayed in the first display area and the captured image displayed in the second display area and corresponding to the NG determination result; and a step of causing the control section to control the display section such that the state information associated with the NG determination result or the captured image designated via the receiving section is displayed on the display section among the plurality of types of state information.

With this program, it is possible to facilitate the extraction of a captured image indicating the pass/fail of laser printing and identification of the cause of the printing defect using the captured image, and further, to improve the usability related to diagnosis of the printing defect.

Further, one embodiment of the present disclosure relates to a computer-readable storage medium. This storage medium stores the diagnosis support program according to the above-described embodiment.

As described above, according to the present disclosure, it is possible to facilitate the extraction of a captured image indicating the pass/fail of laser printing and identification of the cause of the printing defect using the captured image, and further, to improve the usability related to the diagnosis of the printing defect.

BRIEF DESCRIPTION OF THE DRAWINGS

FIG. 15C is a view illustrating a diagnosis screen of the printing defect;

FIG. 16 is a table illustrating an example of a relationship between a cause of the printing defect and a display priority order;

FIG. 17 is a view illustrating the display priority order when a plurality of symptoms are selected;

FIG. 20 is a view illustrating correction of a determination result.

DETAILED DESCRIPTION OF PREFERRED EMBODIMENTS

Hereinafter, embodiments of the present disclosure will be described with reference to the drawings. Note that the following description is given as an example.

Although printing will be described as a typical example of processing in this specification, the technique can be used in various markings using laser light such as a marking of a figure including a QR code (registered trademark) without being limited to the printing.

<Overall Configuration>

Figure 1:
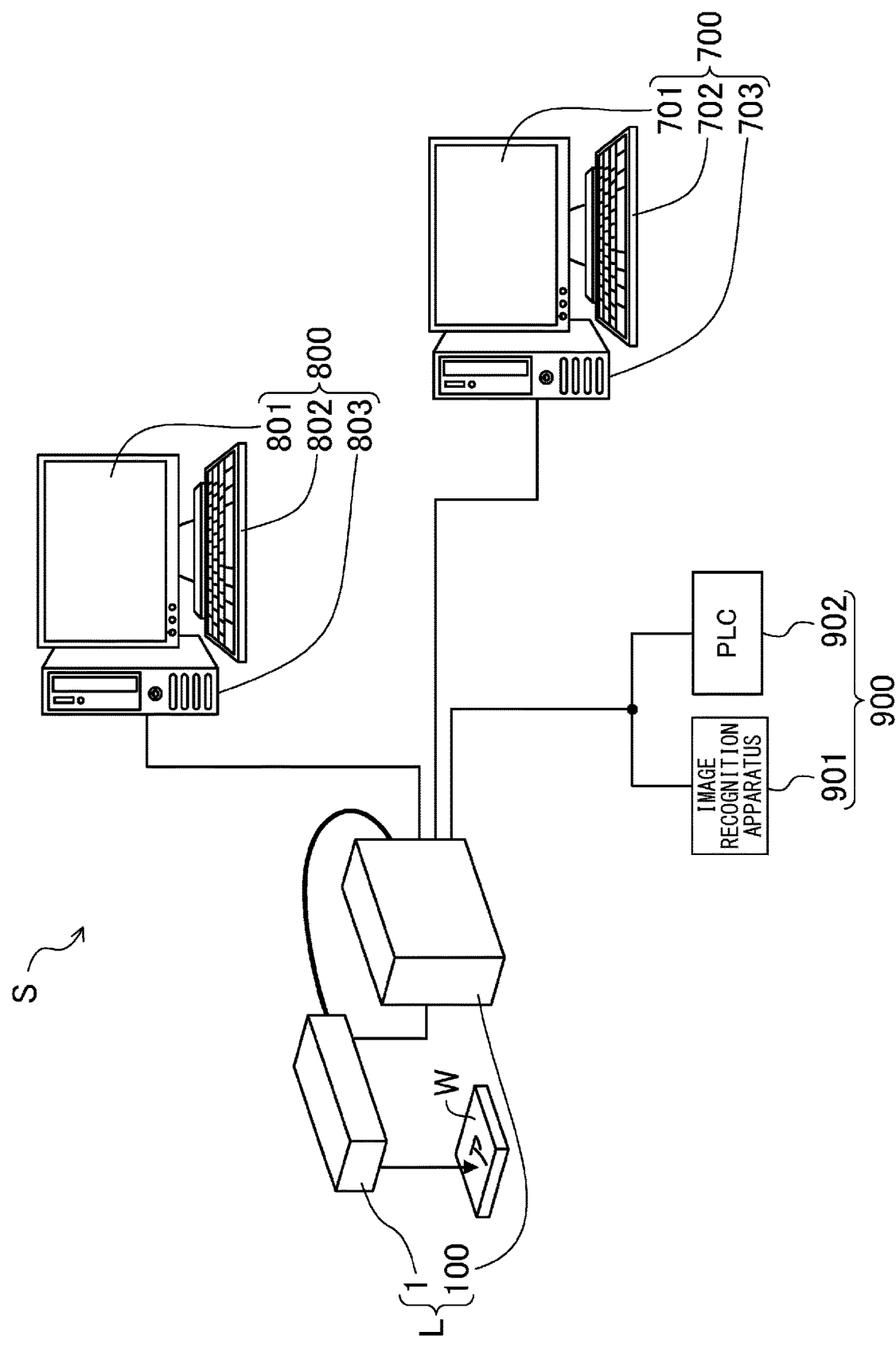
FIG. 1 is a diagram illustrating an overall configuration of a marking system.
Figure 2:
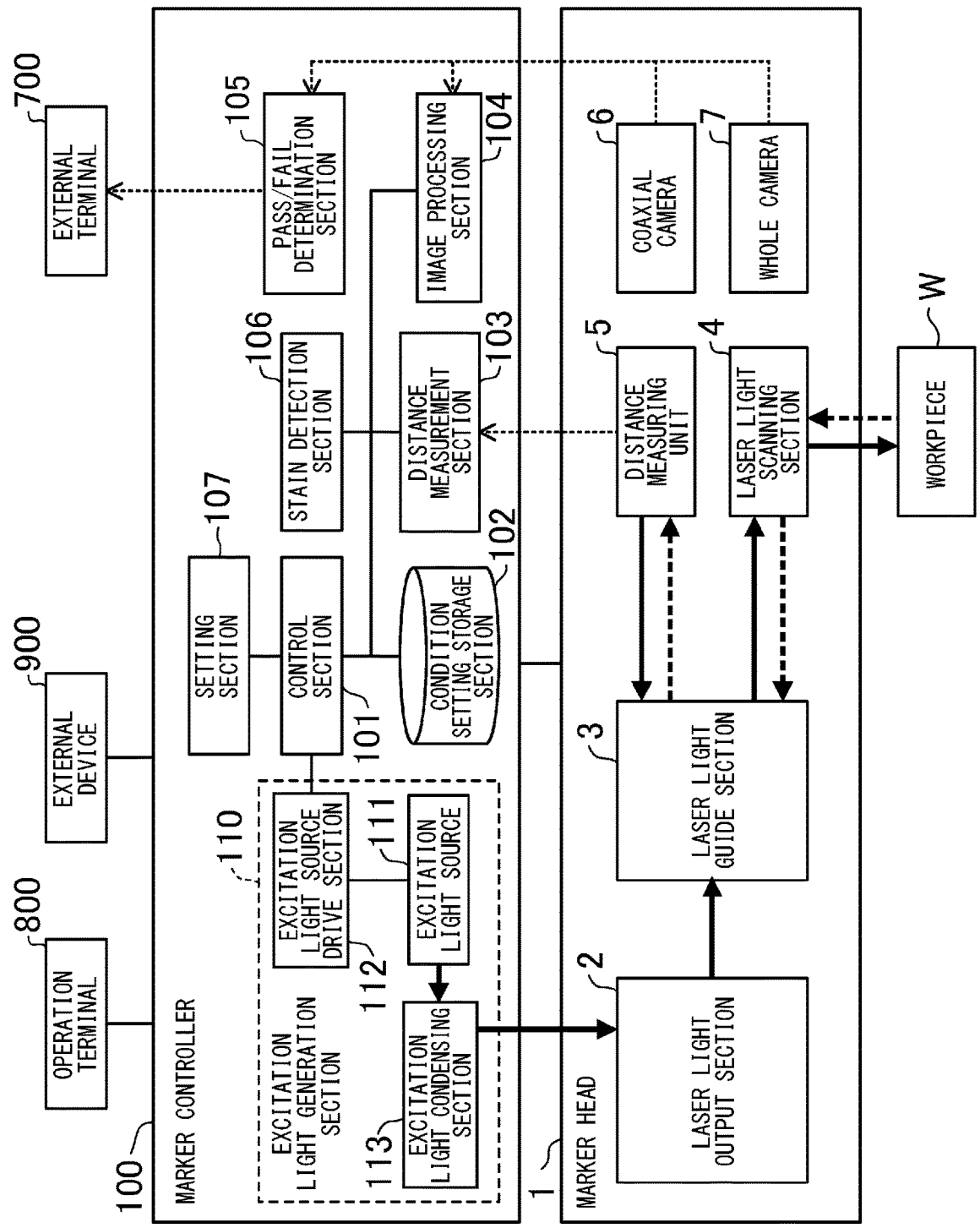
FIG. 2 is a block diagram illustrating a schematic configuration of a laser marker.

FIG. 1 is a diagram illustrating an overall configuration of a marking system S. FIG. 2 is a block diagram illustrating a schematic configuration of a laser marker L in the marking system S. The marking system S illustrated in FIG. 1 includes the laser marker L, and an operation terminal 800, an external device 900, and an external terminal 700 which are connected thereto.

The laser marker L illustrated in FIGS. 1 and 2 irradiates a workpiece W, which is a printed object, with laser light emitted from a marker head 1, and performs three-dimensional scanning on a surface of the workpiece W to perform printing. The "three-dimensional scanning" here indicates a concept that collectively refers to a combination of a two-dimensional operation of scanning an irradiation position of laser light on the surface of the workpiece W (so-called "two-dimensional scanning") and a one-dimensional operation of adjusting a focal position of laser light.

In the following description, the laser light for performing the printing on the workpiece W is sometimes referred to as "printing laser light" to be distinguished from another laser light.

The laser marker L according to this embodiment can measure a distance to the workpiece W (height of the workpiece W) with a distance measuring unit 5 built in the marker head 1 and also adjust a focal position of the printing laser light using the measurement result. The distance measuring unit 5 is an example of a "distance measuring mechanism" in this embodiment.

As illustrated in FIGS. 1 and 2, the laser marker L includes the marker head 1 configured to emit laser light and a marker controller 100 configured to control the marker head 1.

The marker head 1 and the marker controller 100 are separate members in this embodiment, and are electrically connected via an electrical wiring and optically coupled via an optical fiber cable.

More typically, one of the marker head 1 and the marker controller 100 can be incorporated into the other to be integrated. In this case, the optical fiber cable or the like can be omitted as appropriate.

The operation terminal 800 has, for example, a central processing unit (CPU) and a memory, and is connected to the marker controller 100. The operation terminal 800 functions as a terminal configured to set various processing conditions (also referred to as printing conditions) such as printing settings and to display information related to laser marking to a user. The operation terminal 800 includes a display section 801 configured to display information to the user, an operation section 802 that receives an operation input from the user, and a storage apparatus 803 configured to store various types of information.

Specifically, the display section 801 is configured using, for example, a liquid crystal display or an organic EL panel. The display section 801 displays an operation status and printing conditions of the laser marker L as the information related to laser marking. On the other hand, the operation section 802 is configured using, for example, a keyboard and/or a pointing device. Here, the pointing device includes a mouse and/or a joystick. The operation section 802 is configured to receive the operation input from the user, and is used to operate the marker head 1 via the marker controller 100.

The operation terminal 800 configured as described above can set printing conditions in laser marking based on the operation input from the user. Examples of the printing conditions include at least one or more item of a character string that needs to be printed on the workpiece W, a graphic content (marking pattern) such as a barcode and a QR code (registered trademark), an output (target output) required for laser light, and scanning speed (scan speed) of laser light on the workpiece W.

The printing conditions according to this embodiment also include conditions and parameters related to the distance measuring unit 5 (hereinafter, also referred to as "distance measurement conditions"). Examples of the distance measurement conditions include data associating a signal indicating a detection result of the distance measuring unit 5 with a distance to the surface of the workpiece W.

The printing conditions set by the operation terminal 800 are output to the marker controller 100 and stored in a condition setting storage section 102. The storage apparatus 803 in the operation terminal 800 may store the printing conditions as necessary.

Note that the operation terminal 800 can be integrated into the marker controller 100, for example. In this case, a name such as a control unit is used instead of the "operation terminal", but the operation terminal 800 and the marker controller 100 are members separated from each other at least in this embodiment.

The external device 900 is connected to the marker controller 100 of the laser marker L as necessary. In the example illustrated in FIG. 1, an image recognition apparatus 901 and a programmable logic controller (PLC) 902 are provided as the external device 900.

Specifically, the image recognition apparatus 901 determines a type and a position of the workpiece W conveyed on a manufacturing line, for example. As the image recognition apparatus 901, for example, an image sensor can be used. The PLC 902 is used to control the marking system S according to a predetermined sequence.

Further, the laser marker L according to this embodiment includes the external terminal 700 that is connected to the marker controller 100 in a wired or wireless manner. The external terminal 700 can execute a diagnosis support method for supporting the diagnosis of a printing defect that has occurred on the workpiece W, and functions as a diagnosis support apparatus. This diagnosis support method may be executed by the operation terminal 800. In this case, one terminal serves as both the operation terminal 800 and the external terminal 700. Such a configuration can be implemented, for example, by installing a program configured to operate the laser marker L and a program (a diagnosis support program to be described later) configured to execute the diagnosis support method in the common terminal.

Hereinafter, a hardware configuration of each of the marker controller 100 and the marker head 1 and a configuration related to the control of the marker head 1 by the marker controller 100 will be described in order. Thereafter, a configuration of the external terminal 700 which is the diagnosis support apparatus will be described in detail.

<Marker Controller 100>

As illustrated in FIG. 2, the marker controller 100 includes: the condition setting storage section 102 that stores the printing conditions; a control section 101 that controls the marker head 1 based on the printing conditions stored in the condition setting storage section 102; and an excitation light generation section 110 that generates laser excitation light (excitation light).

Specifically, the condition setting storage section 102 is configured using a volatile memory, a non-volatile memory, a hard disk drive (HDD), a solid state drive (SSD), or the like, and can temporarily or consistently store information indicating the printing conditions.

(Control Section 101)

The control section 101 controls at least the excitation light generation section 110 in the marker controller 100, a laser light output section 2, and a laser light guide section 3, a laser light scanning section 4, the distance measuring unit 5, a coaxial camera 6, and the whole camera (non-coaxial camera) 7 in the marker head 1 based on the printing conditions stored in the condition setting storage section 102 to execute printing on the workpiece W.

Specifically, the control section 101 has a CPU, a memory, and an input/output bus, and generates a control signal based on a signal indicating information input via the operation terminal 800 and a signal indicating the printing conditions read from the condition setting storage section 102. The control section 101 outputs the control signal thus generated to each section of the laser marker L to control the printing on the workpiece W and the measurement of the distance to the workpiece W.

For example, when starting processing of the workpiece W, the control section 101 reads a target output stored in the condition setting storage section 102, outputs a control signal generated based on the target output to an excitation light source drive section 112, and controls the generation of laser excitation light.

When actually processing the workpiece W, the control section 101 reads, for example, a printing content (marking pattern) stored in the condition setting storage section 102, outputs a control signal generated based on the printing content to the laser light scanning section 4, and two-dimensionally scans printing laser light.

In this manner, the control section 101 can control the laser light scanning section 4 so as to realize the two-dimensional scanning of the printing laser light.

(Excitation Light Generation Section 110)

The excitation light generation section 110 includes: an excitation light source 111 that generates laser light according to a driving current; the excitation light source drive section 112 that supplies the driving current to the excitation light source 111; and an excitation light condensing section 113 optically coupled to the excitation light source 111.

Hereinafter, the respective sections of the excitation light generation section 110 will be described in order.

The excitation light source drive section 112 supplies a driving current to the excitation light source 111 based on the control signal output from the control section 101. Although not described in detail, the excitation light source drive section 112 determines a driving current based on the target output determined by the control section 101, and supplies the driving current thus determined to the excitation light source 111.

The excitation light source 111 is supplied with a driving current from the excitation light source drive section 112 and oscillates laser light according to the driving current. For example, the excitation light source 111 is configured using a laser diode (LD) or the like, and an LD array or an LD bar in which a plurality of LD elements are linearly arrayed can be used.

The excitation light condensing section 113 condenses the laser light output from the excitation light source 111 and outputs the condensed laser light as laser excitation light (excitation light). For example, the excitation light condensing section 113 is configured using a focusing lens or the like, and has an incident surface on which laser light is incident and an emission surface from which the laser excitation light is output. The excitation light condensing section 113 is optically coupled to the marker head 1 via the optical fiber cable described above. Accordingly, the laser excitation light output from the excitation light condensing section 113 is guided to the marker head 1 via the optical fiber cable.

(Other Constituent Elements)

The marker controller 100 also has a distance measurement section 103 that measures a distance to the workpiece W using the distance measuring unit 5. The distance measurement section 103 is electrically connected to the distance measuring unit 5 and can receive a signal related to a measurement result of the distance measuring unit 5 (at least, a signal indicating a light reception position of distance measuring light in a distance measuring light receiving section 5B).

The laser marker L according to this embodiment further includes the coaxial camera 6 and the whole camera 7 as the non-coaxial camera as will be described later. This laser marker L can capture an image of the surface of the workpiece W by operating at least one of the coaxial camera 6 and the whole camera 7.

The marker controller 100 includes the distance measurement section 103, an image processing section 104, and a pass/fail determination section 105 in order to perform processing related to a captured image Pw generated by the coaxial camera 6 or the whole camera 7.

The marker controller 100 also includes a setting section 107 that sets information on a marking pattern. A setting content of the setting section 107 is read and used by the control section 101 and the like.

Meanwhile, a signal output from the distance measuring unit 5 basically corresponds to the distance to the surface of the workpiece W. However, for example, when a light-transmissive window 19 is stained, a signal corresponding to a distance to a surface of the light-transmissive window 19 is sometimes detected in addition to the signal corresponding to the distance to the surface of the workpiece W. Note that the light-transmissive window 19 referred to herein indicates a window portion through which the printing laser light passes such that the printing laser light generated and amplified inside the marker head 1 is emitted to the outside.

Therefore, the marker controller 100 according to this embodiment further includes a stain detection section 106 configured to detect a stain on the light-transmissive window 19. A detection result of the stain detection section 106 can be output to the distance measurement section 103, the operation terminal 800, and/or the external device 900.

The distance measurement section 103, the image processing section 104, the pass/fail determination section 105, and the stain detection section 106 may be configured using the control section 101. For example, the control section 101 may also serve as the distance measurement section 103.

Further, the image processing section 104 may also function as the pass/fail determination section 105 or the like. Details of the distance measurement section 103, the image processing section 104, the pass/fail determination section 105, and the stain detection section 106 will be described later.

<Marker Head 1>

As described above, the laser excitation light generated by the excitation light generation section 110 is guided to the marker head 1 via the optical fiber cable. The marker head 1 includes: the laser light output section 2 that amplifies and generates laser light based on the laser excitation light and outputs the laser light; the laser light scanning section 4 that irradiates the surface of the workpiece W with the laser light output from the laser light output section 2 to perform two-dimensional scanning; the laser light guide section 3 that forms an optical path from the laser light output section 2 to the laser light scanning section 4; the distance measuring unit 5 configured to measure the distance to the surface of the workpiece W based on the distance measuring light projected and received via the laser light scanning section 4; and the coaxial camera 6 and the whole camera 7 that capture images of the surface of the workpiece W.

Here, the laser light guide section 3 according to this embodiment not only forms the optical path but also is combined with a plurality of members such as a Z scanner (focus adjustment section) 33 adjusting a focal position of laser light, a guide light source 36 emitting guide light, the coaxial camera 6 capturing an image of the surface of the workpiece W, and the like.

The laser light guide section 3 further includes: an upstream merging mechanism 31 that causes the printing laser light output from the laser light output section 2 to merge with the guide light emitted from the guide light source 36; and a downstream merging mechanism 35 that causes the laser light guided to the laser light scanning section 4 to merge with the distance measuring light projected from the distance measuring unit 5.

Figure 3A:
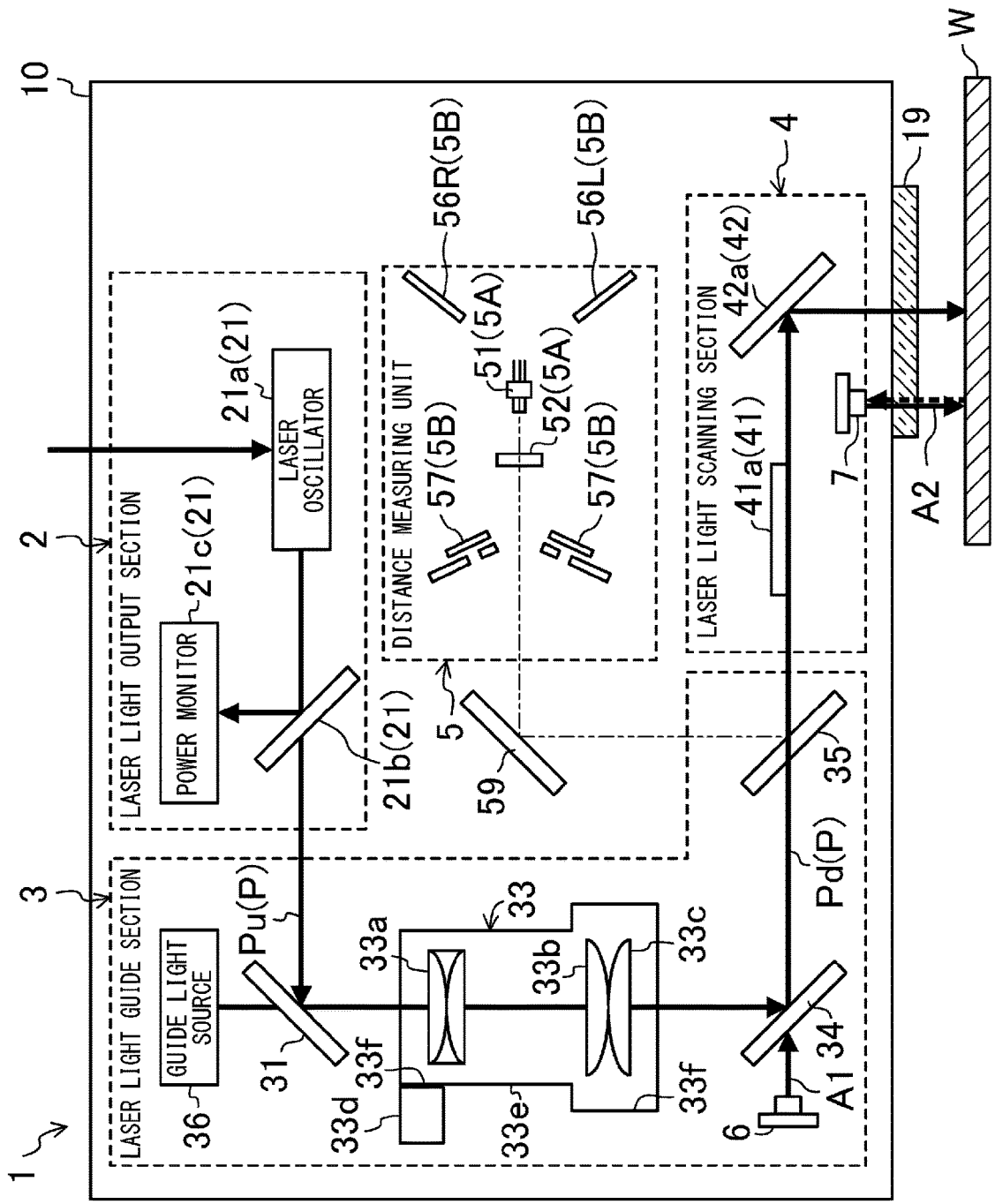
FIG. 3A is a block diagram illustrating a schematic configuration of a marker head.
Figure 3B:
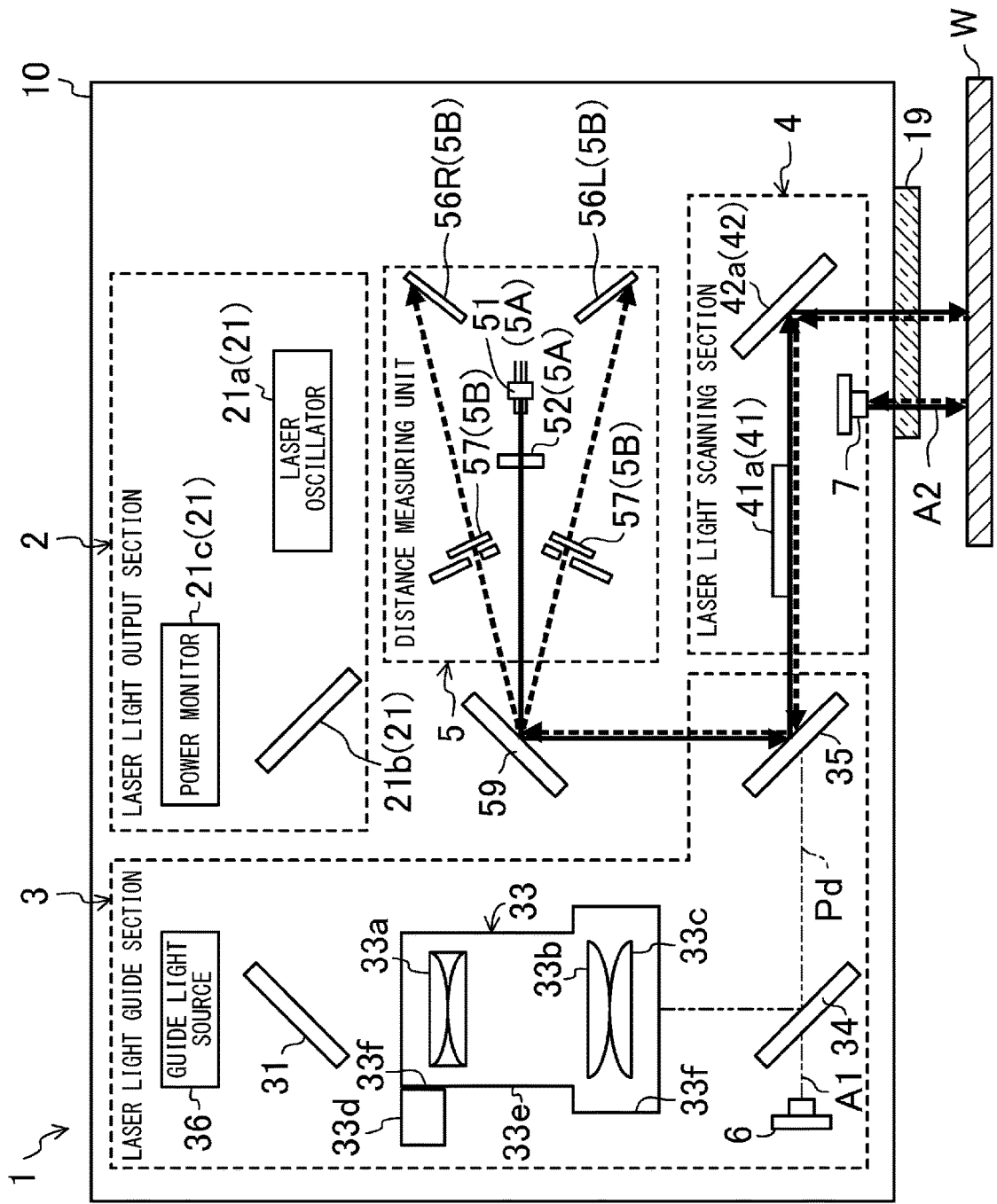
FIG. 3B is a block diagram illustrating the schematic configuration of the marker head.
Figure 4:
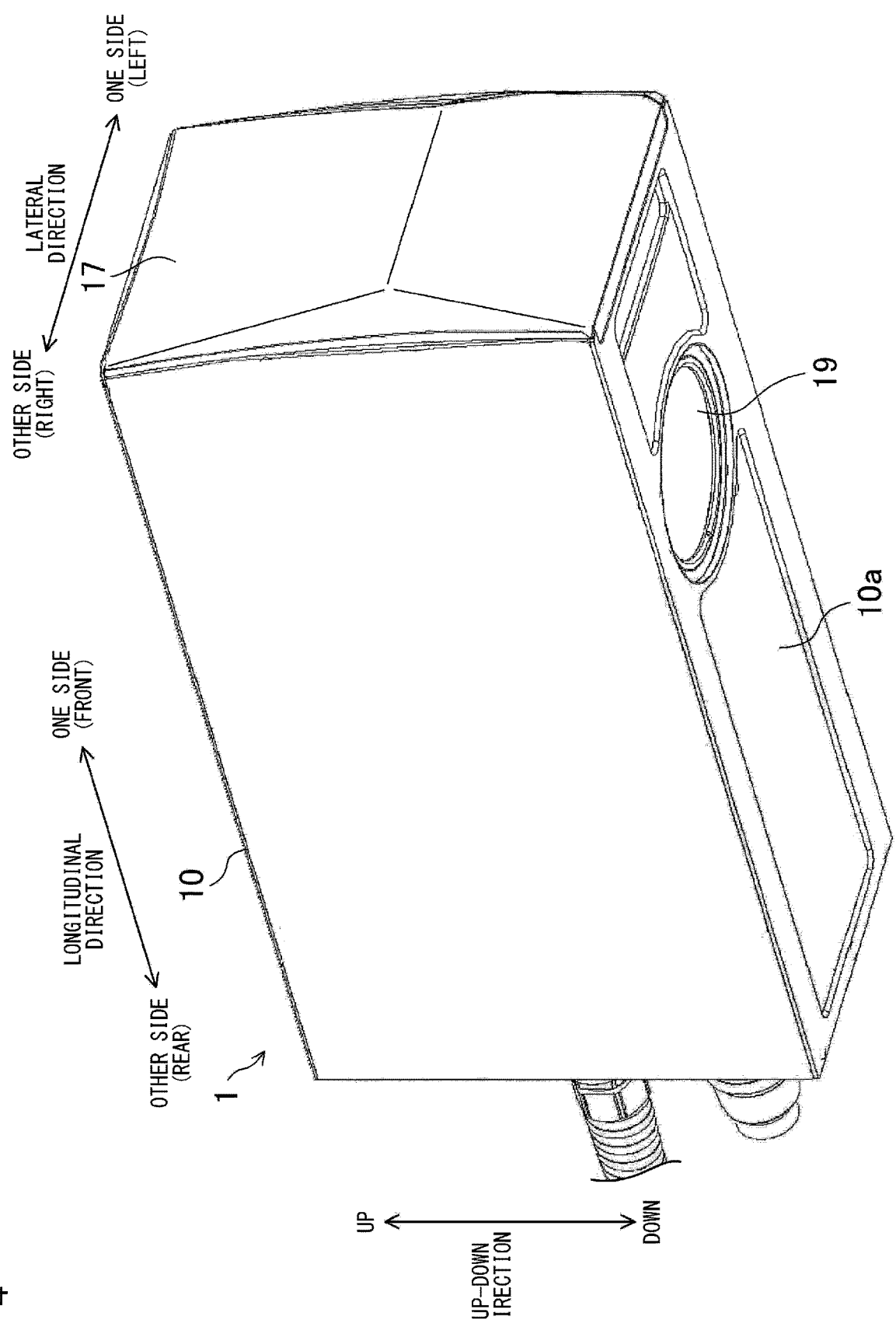
FIG. 4 is a perspective view illustrating an appearance of the marker head.

FIGS. 3A and 3B are block diagrams illustrating the schematic configuration of the marker head 1, and FIG. 4 is a perspective view illustrating an appearance of the marker head 1. Between FIGS. 3A to 3B, FIG. 3A illustrates a case where the workpiece W is processed using printing laser light, and FIG. 3B illustrates a case where the distance measuring unit 5 is used to measure the distance to the surface of the workpiece W.

As illustrated in FIGS. 3A to 4, the marker head 1 includes a housing 10 in which at least the laser light output section 2, and the laser light guide section 3, the laser light scanning section 4 are provided. The housing 10 has a substantially rectangular outer shape as illustrated in FIG. 4. A lower surface of the housing 10 is partitioned by a plate-shaped bottom plate 10a. The bottom plate 10a is provided with a light-transmissive window 19 configured to emit laser light from the marker head 1 to the outside of the marker head 1. The light-transmissive window 19 is configured by fitting a plate-shaped transparent member that can transmit printing laser light, guide light, and distance measuring light into a through-hole that penetrates the bottom plate 10a in a plate thickness direction.

In the following description, a longitudinal direction of the housing 10 in FIG. 4 is sometimes simply referred to as the "longitudinal direction" or a "front-rear direction", and a lateral direction of the housing 10 in the drawings is sometimes simply referred to as the "lateral direction" or a "left-right direction". Similarly, a height direction of the housing 10 in FIG. 4 is sometimes simply referred to as the "height direction" or an "up-down direction".

Figure 5:
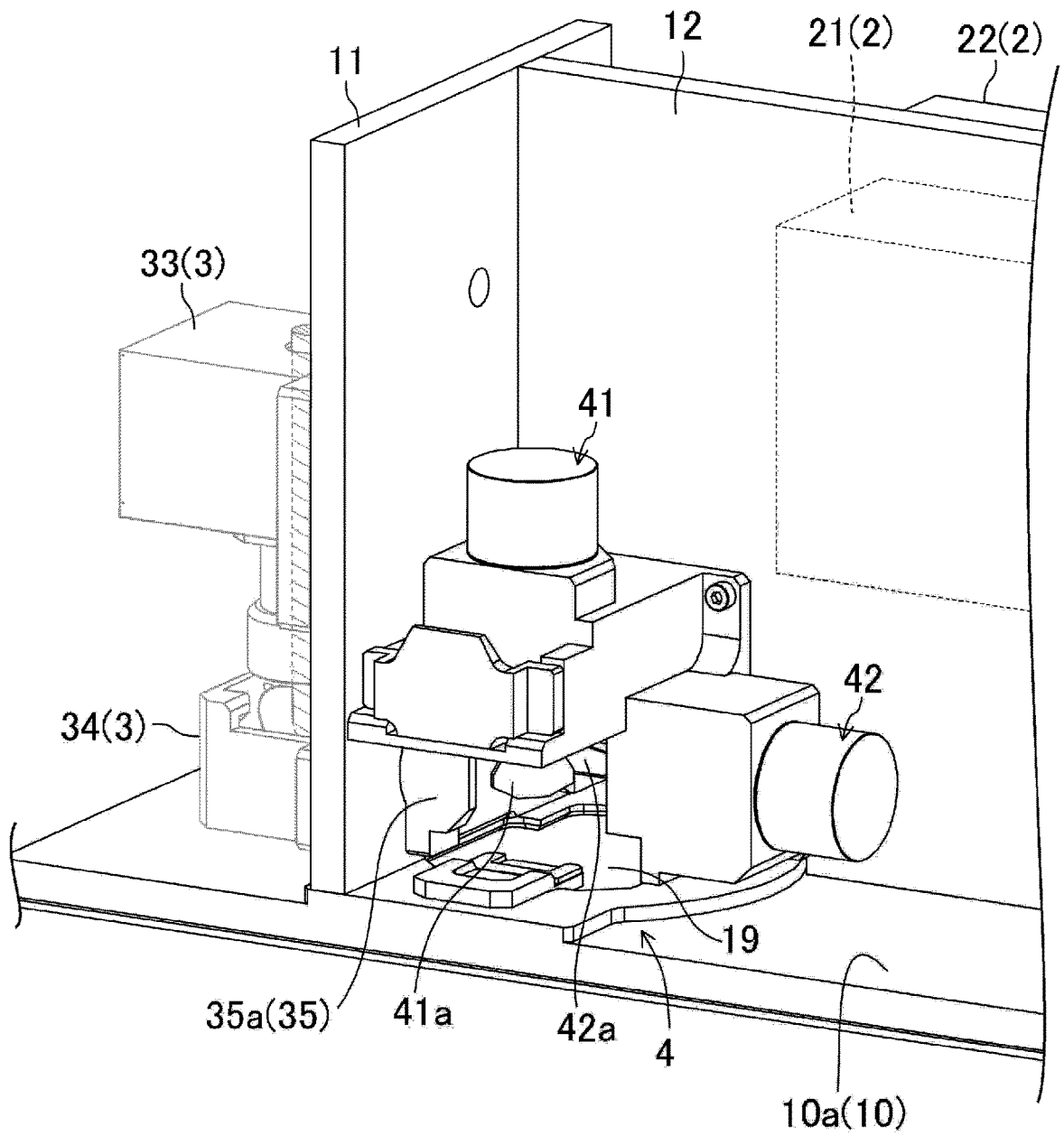
FIG. 5 is a view illustrating a configuration of a laser light scanning section.

FIG. 5 is a perspective view illustrating the configuration of the laser light scanning section 4.

As illustrated in FIG. 5, a partitioning section 11 is provided inside the housing 10. An internal space of the housing 10 is partitioned into one side and the other side in the longitudinal direction by the partitioning section 11.

Specifically, the partitioning section 11 is formed in a flat plate shape extending in a direction perpendicular to the longitudinal direction of the housing 10. Hereinafter, the space partitioned on the other side in the longitudinal direction (rear side in FIG. 4) inside the housing 10 is referred to as a first space S1, and the space partitioned on the one side in the longitudinal direction (front side in FIG. 4) is referred to as a second space S2.

In this embodiment, the laser light output section 2, some components of the laser light guide section 3, the laser light scanning section 4, and the distance measuring unit 5 are arranged inside the first space S1. On the other hand, the main components of the laser light guide section 3 are arranged inside the second space S2.

Specifically, the first space S1 is partitioned by a substantially flat plate-shaped base plate 12 into a space on one side (left side in FIG. 4) and a space on the other side (right side in FIG. 4) in the lateral direction. In the former space, the components constituting the laser light output section 2 are mainly arranged. A heat sink 22 and the like illustrated in FIG. 5 are arranged in the latter space.

The second space S2 accommodates most of the components constituting the laser light guide section 3. These components are accommodated in a space surrounded by the partitioning section 11 and a cover member 17 that partitions the front surface of the housing 10.

Hereinafter, the configurations of the laser light output section 2, the laser light guide section 3, the laser light scanning section 4, and the distance measuring unit 5 will be described in order.

(Laser Light Output Section 2)

The laser light output section 2 is configured to generate printing laser light for printing based on the laser excitation light generated by the excitation light generation section 110 and to output the printing laser light for printing to the laser light guide section 3.

Specifically, the laser light output section 2 includes: a laser oscillator 21a which generates laser light having a predetermined wavelength based on laser excitation light and amplifies the laser light and emits printing laser light; a beam sampler 21b configured to separate a part of the printing laser light oscillated from the laser oscillator 21a; and a power monitor 21c to which the printing laser light separated by the beam sampler 21b is incident.

Although details are omitted, the laser oscillator 21a according to this embodiment includes a laser medium that performs stimulated emission corresponding to laser excitation light to emit laser light, a Q switch configured to pulse the laser light emitted from the laser medium, and a mirror that resonates the laser light pulsed by the Q switch.

The power monitor 21c detects the output of printing laser light. The power monitor 21c is electrically connected to the marker controller 100 and can output a detection signal thereof to the control section 101 and the like.

(Laser Light Guide Section 3)

The laser light guide section 3 forms at least a part of a laser light path P that guides the printing laser light emitted from the laser light output section 2 to the laser light scanning section 4. The laser light guide section 3 includes the Z scanner (focus adjustment section) 33, the guide light source (guide light emission section) 36, and the like, in addition to a bend mirror 34 configured to form the laser light path P. All of these components are provided inside the housing 10 (mainly in the second space S2).

The printing laser light incident from the laser light output section 2 is reflected by the bend mirror 34 and passes through the laser light guide section 3. The Z scanner 33 configured to adjust a focal position of the printing laser light is arranged on the way to the bend mirror 34. The printing laser light, which has passed through the Z scanner 33 and been reflected by the bend mirror 34, is incident to the laser light scanning section 4.

The laser light path P formed by the laser light guide section 3 can be divided into two parts with the Z scanner 33, which is the focus adjustment section, as a boundary. Specifically, the laser light path P formed by the laser light guide section 3 can be divided into an upstream optical path Pu from the laser light output section 2 to the Z scanner 33 and a downstream optical path Pd from the Z scanner 33 to the laser light scanning section 4.

More specifically, the upstream optical path Pu is provided inside the housing 10, and extends from the laser light output section 2 to the Z scanner 33 after passing through the upstream merging mechanism 31.

On the other hand, the downstream optical path Pd is provided inside the housing 10, and extends from the Z scanner 33 to a first scanner 41 in the laser light scanning section 4 after sequentially passing through the bend mirror 34 and the downstream merging mechanism 35.

In this manner, inside the housing 10, the upstream merging mechanism 31 is provided in the middle of the upstream optical path Pu, and the downstream merging mechanism 35 is provided in the middle of the downstream optical path Pd.

—Z Scanner 33—

The Z scanner 33, which is the focus adjustment section, is arranged in the middle of the optical path formed by the laser light guide section 3, and can adjust the focal position of the printing laser light emitted from the laser light output section 2.

Specifically, the Z scanner 33 is provided in the middle of an optical path from the upstream merging mechanism 31, which is a guide light merging mechanism, to the laser light scanning section 4 in the laser light path P inside the housing 10.

Specifically, the Z scanner 33 according to this embodiment includes: an input lens 33a that transmits the printing laser light emitted from the laser light output section 2; a collimator lens 33b that transmits the printing laser light having passed through the input lens 33a; an output lens 33c that transmits the printing laser light having passed through the input lens 33a and the collimator lens 33b; a lens drive section 33d that moves the input lens 33a; and a casing 33e that accommodates the input lens 33a, the collimator lens 33b, and the output lens 33c, as illustrated in FIGS. 3A to 3B.

The Z scanner 33, which is the focus adjustment section, functions as a mechanism configured to scan the printing laser light in the up-down direction. Hereinafter, a scanning direction of the Z scanner 33 is sometimes referred to as a "Z direction".

The printing laser light passing through the Z scanner 33 is coaxial with the guide light emitted from the guide light source 36. Therefore, not only the printing laser light but also the focal position of the guide light can be adjusted together by operating the Z scanner 33.

Note that the Z scanner 33 according to this embodiment, particularly the lens drive section 33*d* in the Z scanner 33, is configured to operate based on the control signal output from the control section 101.

—Bend Mirror 34—

The bend mirror 34 is provided in the middle of the downstream optical path Pd, and is arranged so as to bend the optical path Pd to be directed toward the rear side. Although not illustrated, the bend mirror 34 is arranged at substantially the same height as an optical member 35*a* in the downstream merging mechanism 35, and can reflect printing laser light and guide light that have passed through the Z scanner 33.

The printing laser light and guide light reflected by the bend mirror 34 propagate rearward, pass through the downstream merging mechanism 35, and reach the laser light scanning section 4 (specifically, the first scanner 41).

—Downstream Merging Mechanism 35—

The downstream merging mechanism 35 causes the distance measuring light emitted from the distance measuring light emitting section 5A in the distance measuring unit 5 to merge with the downstream optical path Pd to be guided toward the workpiece W via the laser light scanning section 4. In addition, the downstream merging mechanism 35 guides the distance measuring light, which has been reflected by the workpiece W and returned sequentially to the laser light scanning section 4 and the downstream optical path Pd, to the distance measuring light receiving section 5B in the distance measuring unit 5.

The downstream merging mechanism 35 can be configured using, for example, a dichroic mirror. Specifically, the downstream merging mechanism 35 according to this embodiment has a dichroic mirror 35*a* that transmits one of the distance measuring light and the guide light and reflects the other (see FIG. 5). Accordingly, the printing laser light and the guide light are incident on the mirror surface on the one side of the dichroic mirror 35*a*, and the distance measuring light is incident on the mirror surface on the other side.

The dichroic mirror 35*a* according to this embodiment can reflect the distance measuring light and transmit the printing laser light and the guide light. As a result, for example, when the distance measuring light emitted from the distance measuring unit 5 is incident on the dichroic mirror 35*a*, the distance measuring light can be caused to merge with the downstream optical path Pd to be coaxial with the printing laser light and the guide light. The printing laser light, the guide light, and the distance measuring light made coaxial in this manner reach the first scanner 41 as illustrated in FIGS. 3A and 3B.

Meanwhile, the distance measuring light that has been reflected by the workpiece W returns to the laser light scanning section 4 and reaches the downstream optical path Pd. The distance measuring light that has returned to the downstream optical path Pd is reflected by the dichroic mirror 35*a* in the downstream merging mechanism 35 and reaches the distance measuring unit 5.

(Laser Light Scanning Section 4)

As illustrated in FIG. 3A, the laser light scanning section 4 is configured to irradiate the workpiece W with laser light (printing laser light) emitted from the laser light output section 2 and guided by the laser light guide section 3, and to perform two-dimensional scanning on the surface of the workpiece W.

In the example illustrated in FIG. 5, the laser light scanning section 4 is configured as a so-called biaxial galvano scanner. That is, the laser light scanning section 4 includes: the first scanner 41 configured to scan the printing laser light incident from the laser light guide section 3 in a first direction; and a second scanner 42 configured to scan the printing laser light scanned by the first scanner 41 in a second direction.

Here, the second direction indicates a direction substantially orthogonal to the first direction. Accordingly, the second scanner 42 can scan the printing laser light in the direction substantially orthogonal to the first scanner 41. In this embodiment, the first direction is equal to the front-rear direction (the longitudinal direction of the housing 10) and the second direction is equal to the left-right direction (the lateral direction of the housing 10). Hereinafter, the first direction is referred to as an "X direction", and the second direction orthogonal thereto is referred to as a "Y direction". Both the X direction and the Y direction are orthogonal to the above-described Z direction.

The first scanner 41 has a first mirror 41*a* at a distal end thereof. The first mirror 41*a* is rotationally driven by a motor (not illustrated) built in the first scanner 41. This motor can rotate the first mirror 41*a* about a rotation axis extending in the up-down direction. A reflection angle of printing laser light by the first mirror 41*a* can be adjusted by adjusting a rotation posture of the first mirror 41*a*.

Similarly, the second scanner 42 has a second mirror 42*a* at a distal end thereof. The second mirror 42*a* is rotationally driven by a motor (not illustrated) built in the second scanner 42. This motor can rotate the second mirror 42*a* about a rotation axis extending in the front-rear direction. A reflection angle of printing laser light by the second mirror 42*a* can be adjusted by adjusting a rotation posture of the second mirror 42*a*.

When printing laser light is incident on the laser light scanning section 4 from the downstream merging mechanism 35, the printing laser light is sequentially reflected by the first mirror 41*a* in the first scanner 41 and the second mirror 42*a* in the second scanner 42, and is emitted to the outside of the marker head 1 via the light-transmissive window 19.

At that time, it is possible to scan the printing laser light in the first direction on the surface of the workpiece W by operating the motor of the first scanner 41 to adjust the rotation posture of the first mirror 41*a*. At the same time, it is possible to scan the printing laser light in the second direction on the surface of the workpiece W by operating the motor of the second scanner 42 to adjust the rotation posture of the second mirror 42*a*.

As described above, not only the printing laser light but also the guide light that has passed through the optical member 35*a* of the downstream merging mechanism 35 or the distance measuring light reflected by the same member 35*a* is also incident to the laser light scanning section 4. The laser light scanning section 4 according to this embodiment can two-dimensionally scan the guide light or the distance measuring light incident in this manner by operating the first scanner 41 and the second scanner 42, respectively.

In this manner, the laser light scanning section 4 according to this embodiment is electrically controlled by the control section 101, which is the scanning control section, and can irradiate a printing area R1 set on the surface of the workpiece W with printing laser light to form a predetermined printing pattern (marking pattern) in the printing area R1.

(Coaxial Camera 6)

The coaxial camera 6 has an imaging optical axis A1 branching from the laser light path P from the laser light output section 2 to the laser light scanning section 4 (see FIGS. 3A and 3B). The coaxial camera 6 captures an image of the workpiece W with the laser light scanning section 4. The coaxial camera 6 captures an image of the workpiece W arranged in the area (printing area R1) that is two-dimensionally scanned by the laser light scanning section 4 to generate the captured image Pw including at least a part of the workpiece W. The coaxial camera 6 is an example of an "image acquisition section" in this embodiment.

The coaxial camera 6 is configured as an imaging mechanism that is coaxial with printing laser light for printing. The coaxial camera 6 has a narrower field of view than the whole camera 7, but can generate an image in which the printing area R1 is enlarged at a relatively high magnification as the captured image Pw and can two-dimensionally scan an imaging area with the laser light scanning section 4. The coaxial camera 6 is used, for example, to generate an image in which a part of the printing area R1 has been locally enlarged.

The captured image Pw generated by the coaxial camera 6 can be displayed on the display section 801 in a state where at least a part thereof is enlarged or reduced.

The coaxial camera 6 according to this embodiment is built in the housing 10. Specifically, the coaxial camera 6 is arranged at substantially the same height as the bend mirror 34 in the laser light guide section 3. The coaxial camera 6 receives the reflected light incident to the laser light guide section 3 from the laser light scanning section 4. The coaxial camera 6 is configured such that the reflected light reflected at a printing point of the workpiece W enters via the bend mirror 34. The coaxial camera 6 can form an image of the reflected light thus entered to capture an image of the surface of the workpiece W. Note that the layout of the coaxial camera 6 can be changed as appropriate. For example, the heights of the coaxial camera 6 and the bend mirror 34 may be different from each other.

The reflected light used for image formation by the coaxial camera 6 branches off from the downstream optical path Pd and propagates. Accordingly, the printing area R1 illustrated in FIG. 9 can be two-dimensionally scanned by appropriately operating the laser light scanning section 4.

The coaxial camera 6 according to this embodiment is configured to operate based on the control signal output from the control section 101 similarly to the guide light source 36 or the like.

(Whole Camera 7)

Figure 9:
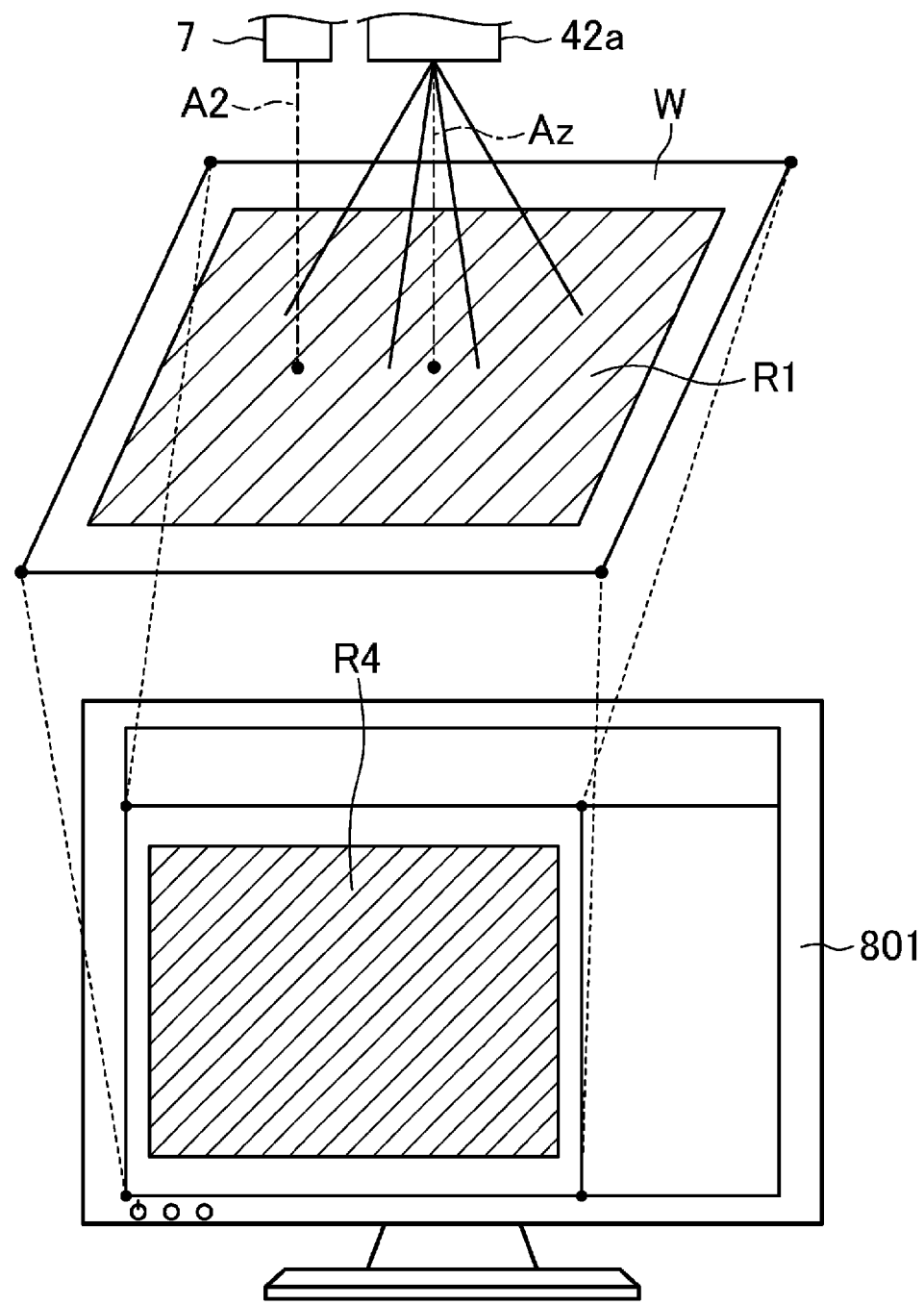
FIG. 9 is a view illustrating a relationship between a processing area and a setting plane.

The whole camera 7 has an imaging optical axis A2 independent of the laser light path P (see FIG. 9). The whole camera 7 captures an image of the workpiece W without the laser light scanning section 4. Similar to the coaxial camera 6, the whole camera 7 captures an image of the workpiece W arranged in the area (printing area R1) that is two-dimensionally scanned by the laser light scanning section 4 to generate the captured image Pw including at least a part of the workpiece W. The whole camera 7 is an example of the "image acquisition section" in this embodiment.

The whole camera 7 is configured as an imaging mechanism that is non-coaxial with printing laser light for printing. The whole camera 7 is not capable of performing two-dimensional scanning using the laser light scanning section 4, but has the wider field of view than the coaxial camera 6, and can generate an image obtained by capturing an image of the printing area R1 in a relatively wide field of view as the captured image Pw. The whole camera 7 is used, for example, to capture an image of the entire printing area R1 at once.

The captured image Pw generated by the whole camera 7 can be displayed on the display section 801 in a state where at least a part thereof is enlarged or reduced. The display section 801 can display the captured image Pw generated by the whole camera 7 and the captured image Pw generated by the coaxial camera 6 side by side or selectively display one of the two types of captured image Pw.

The whole camera 7 according to this embodiment is arranged immediately above the light-transmissive window 19 and is fixed in a posture in which an imaging lens thereof faces downward. As described above, the imaging optical axis A2 of the whole camera 7 is not coaxial with an optical axis Az of the above-described printing laser light (see FIGS. 3A, 3B, and 9).

Note that the "image acquisition section" according to this embodiment includes at least one of the coaxial camera 6 and the whole camera 7. That is, the captured image Pw may be generated using either the coaxial camera 6 or the whole camera 7, or may be generated using the both in combination. The configuration including both the coaxial camera 6 and the whole camera 7 is not essential. Either one may be provided.

(Distance Measuring Unit 5)

As illustrated in FIG. 3B, the distance measuring unit 5 projects distance measuring light via the laser light scanning section 4 and irradiates the surface of the workpiece W with the distance measuring light. The distance measuring unit 5 also receives the distance measuring light reflected by the surface of the workpiece W via the laser light scanning section 4.

The distance measuring unit 5 is mainly divided into a module for projection of distance measuring light and a module for reception of distance measuring light. Specifically, the distance measuring unit 5 includes: the distance measuring light emitting section 5A configured as the module for projection of distance measuring light; and the distance measuring light receiving section 5B configured as the module for reception of distance measuring light.

The distance measuring light emitting section 5A is provided inside the housing 10, and emits distance measuring light for measurement of the distance from the marker head 1 to the surface of the workpiece W in the laser marker L toward the laser light scanning section 4.

On the other hand, the distance measuring light receiving section 5B is provided inside the housing 10 similarly to the distance measuring light emitting section 5A, and receives distance measuring light which has been reflected on the surface of the workpiece W and has returned via the laser light scanning section 4 and the downstream merging mechanism 35.

Hereinafter, the configurations of the respective sections of the distance measuring unit 5 will be described in order.

—Distance Measuring Light Emitting Section 5A—

The distance measuring light emitting section 5A is provided inside the housing 10, and is configured to emit the distance measuring light for measurement of the distance from the marker head 1 to the surface of the workpiece W in the laser marker L.

Specifically, the distance measuring light emitting section 5A includes a distance measuring light source 51 and a light projecting lens 52 described above.

The distance measuring light source 51 emits distance measuring light toward the front side of the housing 10 in accordance with the control signal input from the control section 101. Specifically, the distance measuring light source 51 according to this embodiment can emit laser light in a visible light range as the distance measuring light.

The light projecting lens 52 can be, for example, a plano-convex lens. The light projecting lens 52 collects the distance measuring light emitted from the distance measuring light source 51 and emits the distance measuring light to the outside of the casing.

The distance measuring light emitted from the distance measuring light source 51 passes through the central portion of the light projecting lens 52 and is output to the outside of the distance measuring unit 5. The distance measuring light thus output is reflected by the bend mirror 59 and the optical member 35a in the downstream merging mechanism 35, and is incident to the laser light scanning section 4.

The distance measuring light incident to the laser light scanning section 4 is sequentially reflected by the first mirror 41a of the first scanner 41 and the second mirror 42a of the second scanner 42, and is emitted from the light-transmissive window 19 to the outside of the marker head 1.

As described in the description of the laser light scanning section 4, it is possible to scan the distance measuring light in the first direction on the surface of the workpiece W by adjusting the rotation posture of the first mirror 41a of the first scanner 41. At the same time, it is possible to scan the distance measuring light in the second direction on the surface of the workpiece W by operating the motor of the second scanner 42 to adjust the rotation posture of the second mirror 42a.

The distance measuring light thus scanned is reflected on the surface of the workpiece W. A part of the distance measuring light thus reflected (hereinafter, also referred to as "reflected light") is incident to the inside of the marker head 1 through the light-transmissive window 19. The reflected light that has been incident to the inside of the marker head 1 returns to the laser light guide section 3 via the laser light scanning section 4. The reflected light is reflected by the optical member 35a of the downstream merging mechanism 35 in the laser light guide section 3 and is incident to the distance measuring unit 5 via the bend mirror 59.

—Distance Measuring Light Receiving Section 5B—

The distance measuring light receiving section 5B is provided inside the housing 10, and is configured to receive distance measuring light (equivalent to the above-described "reflected light") emitted from the distance measuring light emitting section 5A and reflected by the workpiece W.

Specifically, the distance measuring light receiving section 5B has the pair of light receiving elements 56L and 56R and the light receiving lens 57.

The pair of light receiving elements 56L and 56R have light receiving surfaces oriented diagonally forward, respectively, and detect light reception positions of the reflected light on the respective light receiving surfaces, and output signals (detection signals) indicating the detection results. The detection signals output from the respective light receiving elements 56L and 56R are input to the marker controller 100 and reach the distance measurement section 103.

The light receiving lens 57 is arranged inside the housing 10 so as to allow passage of each of the optical axes of the pair of light receiving elements 56L and 56R. The light receiving lens 57 is also provided in the middle of an optical path connecting the downstream merging mechanism 35 and the pair of light receiving elements 56L and 56R, and can collect the reflected light that has passed through the downstream merging mechanism 35 on the respective light receiving surfaces of the pair of light receiving elements 56L and 56R.

The light receiving lens 57 collects the reflected light that has returned to the laser light scanning section 4 and forms a spot of the reflected light on the light receiving surface of each of the light receiving elements 56L and 56R. The respective light receiving elements 56L and 56R output signals indicating a peak position of the spot thus formed and the light reception amount to the distance measurement section 103.

Basically, the laser marker L can measure the distance to the surface of the workpiece W based on the light reception position of the reflected light (the position of the peak of the spot in this embodiment) on the light receiving surface of each of the light receiving elements 56L and 56R. A so-called triangulation method is used as a distance measurement method.

—Regarding Distance Measurement Method—

Figure 6:
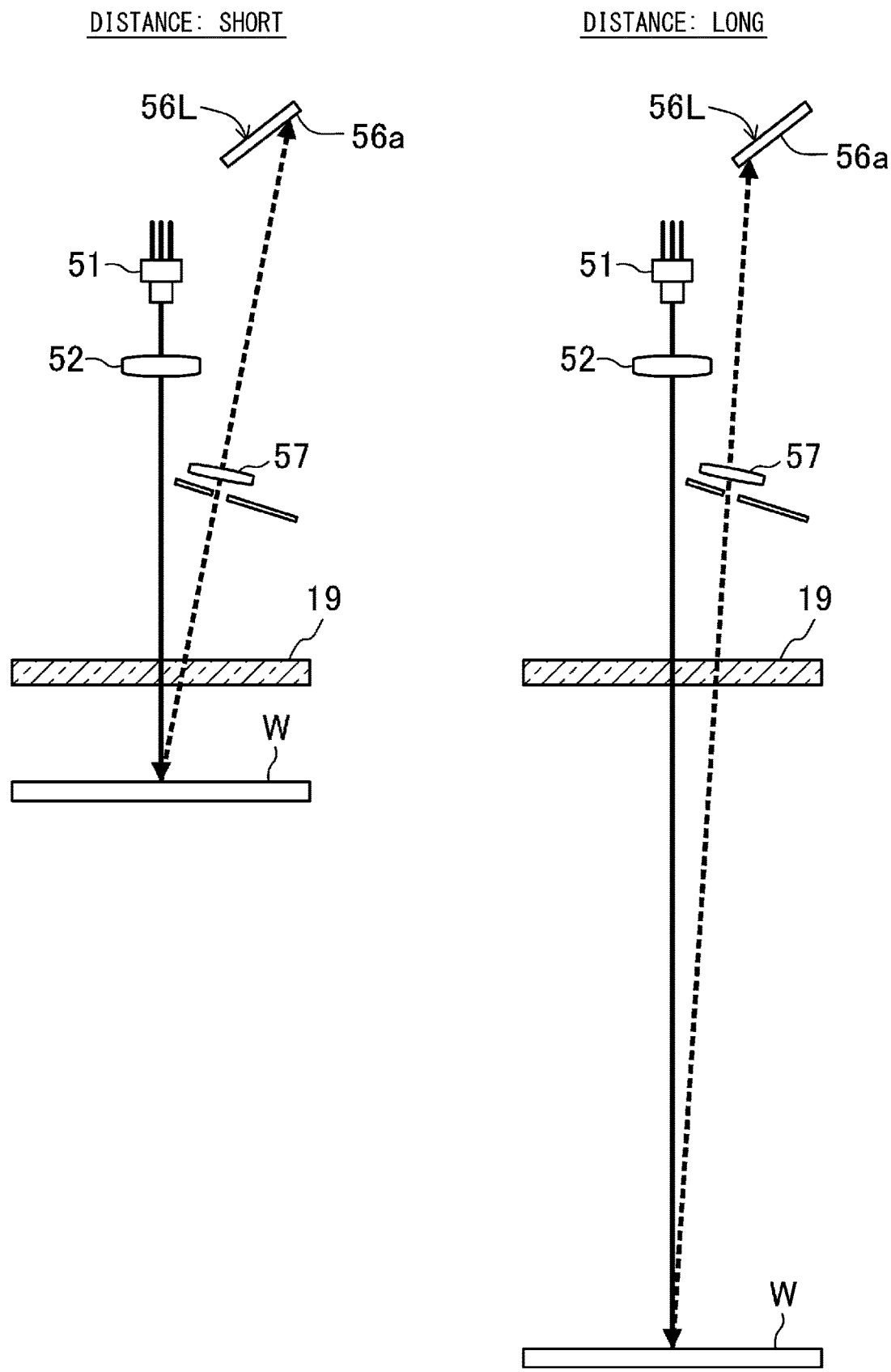
FIG. 6 is a view illustrating a triangulation method.

FIG. 6 is a view illustrating the triangulation method. Although FIG. 6 illustrates only the distance measuring unit 5, the following description is common to the case where distance measuring light is emitted via the laser light scanning section 4 as described above.

As illustrated in FIG. 6, when distance measuring light is emitted from the distance measuring light source 51 in the distance measuring light emitting section 5A, the surface of the workpiece W is irradiated with the distance measuring light. When the distance measuring light is reflected by the workpiece W, the reflected light (especially diffused and reflected light) propagates isotropically if the influence of specular reflection has been eliminated.

Although the reflected light propagating in this manner contains a component incident to the light receiving element 56L via the light receiving lens 57, an angle of incidence of the incident light to the light receiving element 56L increases or decreases depending on the distance between the marker head 1 and the workpiece W. When the angle of incidence with respect to the light receiving element 56L increases or decreases, a light reception position on a light receiving surface 56a is displaced.

In this manner, the distance between the marker head 1 and the workpiece W and the light reception position on the light receiving surface 56a are associated with each other in a predetermined relationship. Therefore, when such a relationship is grasped in advance and stored in the marker controller 100, for example, the distance between the marker head 1 and the workpiece W can be calculated from the light reception position on the light receiving surface 56a. Such a calculation method is nothing but a method using a so-called triangulation method.

That is, the distance measurement section 103 measures the distance from the laser marker L to the surface of the workpiece W by the triangulation method based on the light reception position of the distance measuring light in the distance measuring light receiving section 5B.

Specifically, the condition setting storage section 102 stores, in advance, the relationship between the light reception position on the light receiving surface 56a and the distance from the marker head 1 to the surface of the workpiece W. On the other hand, a signal, which indicates the light reception position of the distance measuring light in the distance measuring light receiving section 5B, specifically, a position of a peak of a spot formed on the light receiving surface 56a by the reflected light of the distance measuring light, is input to the distance measurement section 103.

The distance measurement section 103 measures the distance to the surface of the workpiece W based on the signal thus input and the relationship stored in the condition setting storage section 102. The measurement value thus obtained is input to, for example, the control section 101, and is used by the control section 101 to control the Z scanner 33 and the like.

For example, the laser marker L automatically or manually determines a site (printing point) to be processed by the marker head 1 on the surface of the workpiece W. Subsequently, the laser marker L measures the distance to each printing point (more accurately, a distance measuring point set around the printing point) prior to execution of printing, and determines control parameters of the Z scanner 33 such that a focal position is commensurate with the measured distance. The laser marker L operates the Z scanner 33 based on the control parameters thus determined, and then performs printing on the workpiece W with printing laser light.

Hereinafter, a specific method for using the marking system S will be described.

<Regarding Method for Using Marking System S>

Figure 7:
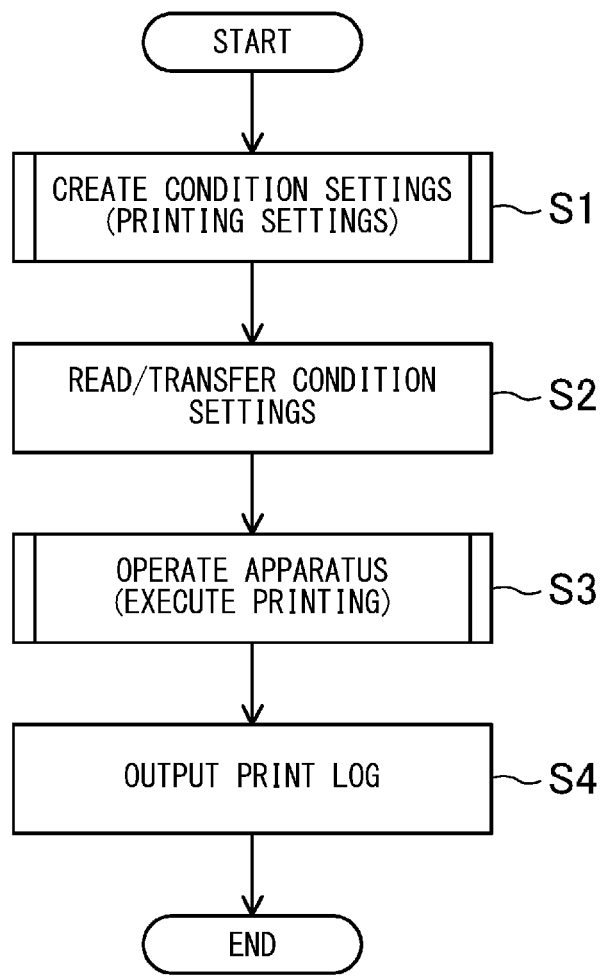
FIG. 7 is a flowchart illustrating a method for using the marking system.
Figure 8:
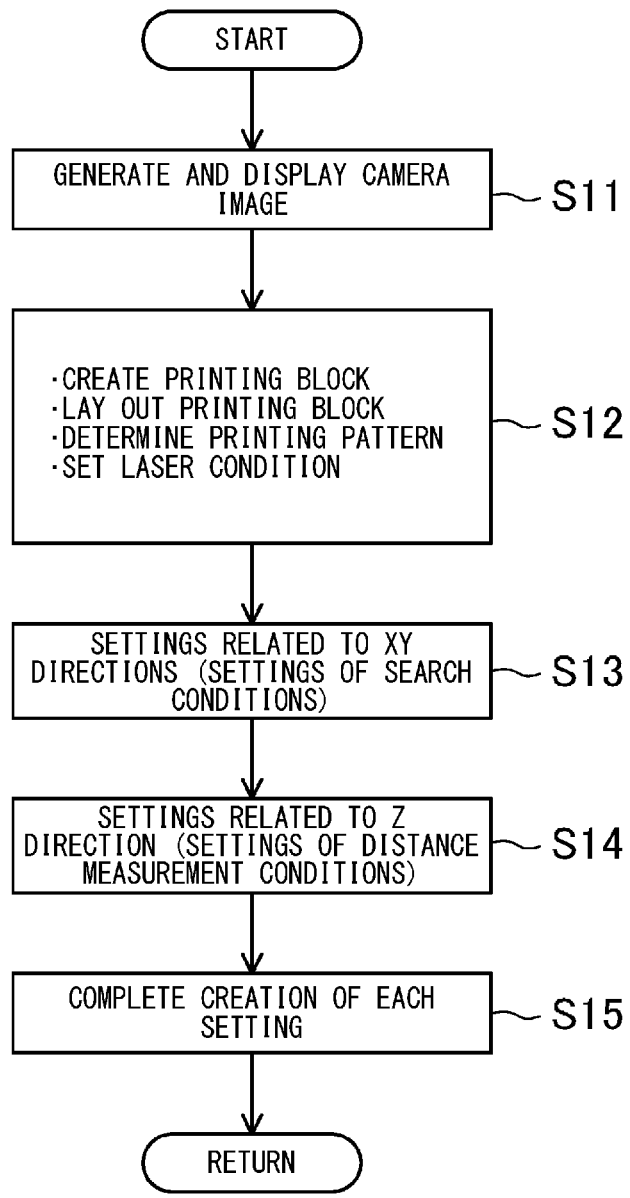
FIG. 8 is a flowchart illustrating a procedure for creating printing settings, search settings, and distance measurement settings.
Figure 10:
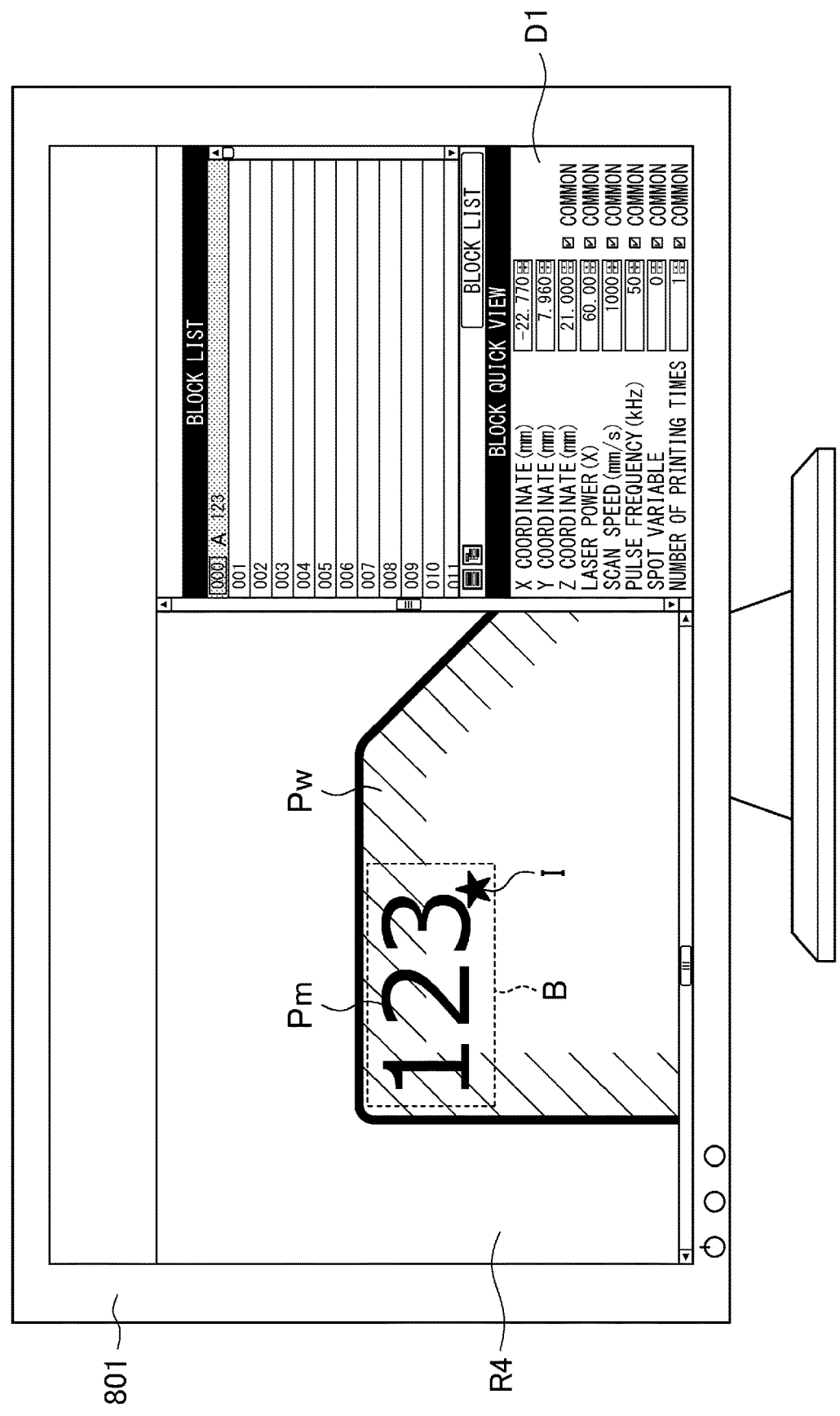
FIG. 10 is a view illustrating display content on a display section.

FIG. 7 is a flowchart illustrating a method for using the marking system S. FIG. 8 is a flowchart illustrating a procedure for creating printing settings, search settings, and distance measurement settings, FIG. 9 is a view illustrating a relationship between the printing area R1 and a setting plane R4, and FIG. 10 is a view illustrating a display content on the display section 801.

Figure 11:
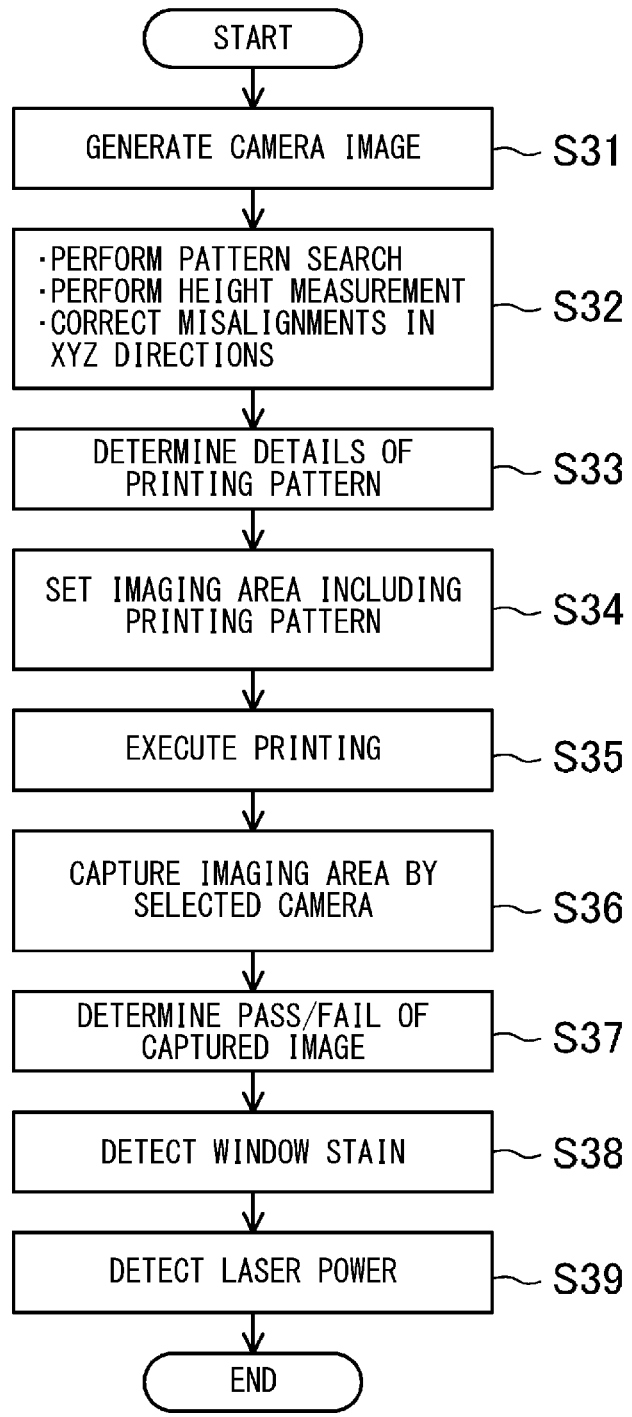
FIG. 11 is a flowchart illustrating a procedure for operating the laser marker.
Figure 12:
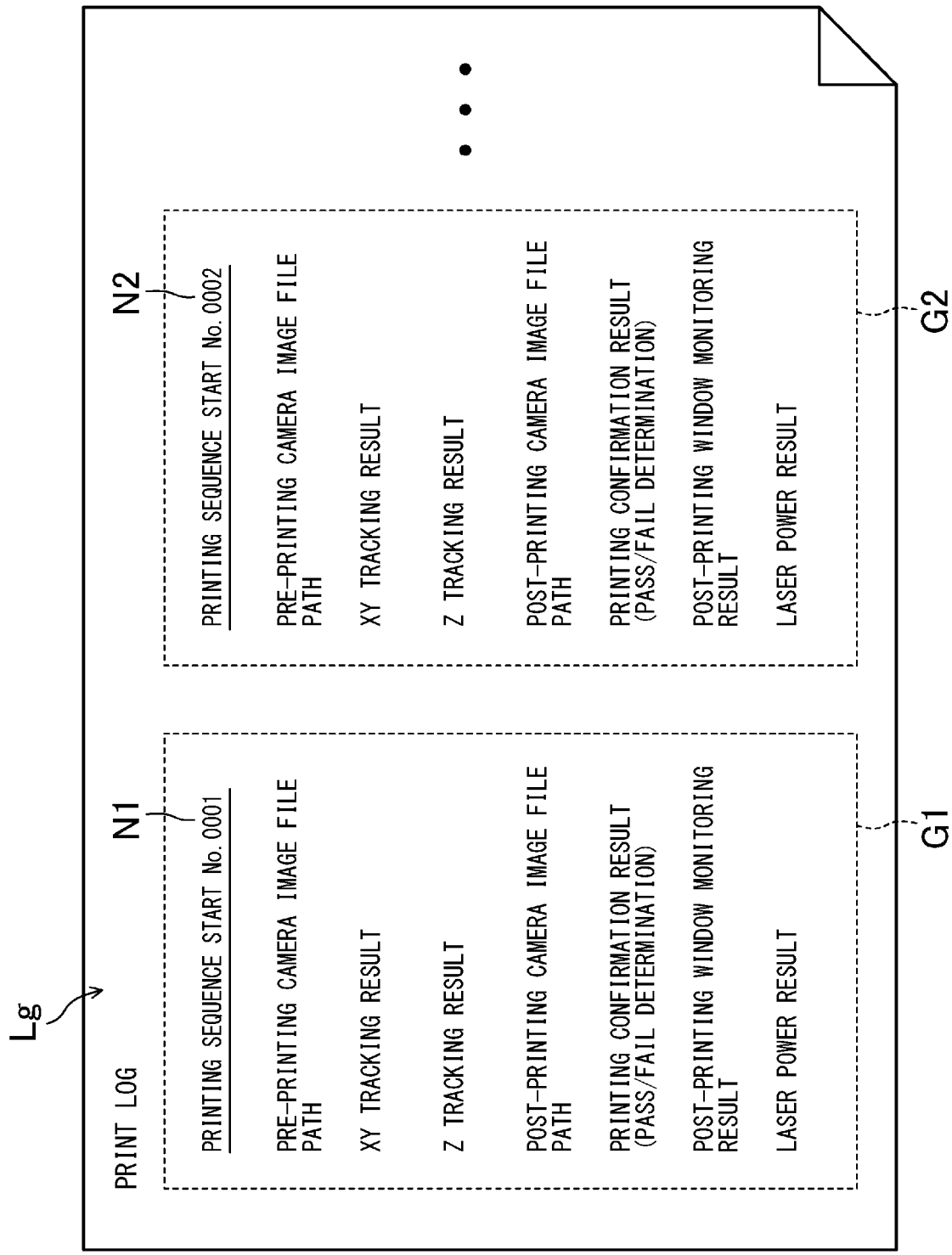
FIG. 12 is a view illustrating an example of a content of a print log.

Further, FIG. 11 is a flowchart illustrating a procedure for operating the laser marker L. FIG. 12 is a view illustrating a content of a print log Lg generated when the laser marker L is operated.

The marking system S provided with the laser marker L can be operated in the state of being installed, for example, on a manufacturing line of a factory. When being operated, first, condition settings, such as an installation position of the workpiece W which is to flow through the line, and each output of printing laser light and distance measuring light with which the workpiece W is irradiated, are created prior to the operation of the manufacturing line (Step S1).

A setting content created in Step S1 is transferred to and stored in the marker controller 100 and/or the operation terminal 800 or is read by the marker controller 100 immediately after creation (Step S2).

Then, when the manufacturing line is operated, the marker controller 100 refers to the setting content stored in advance or read immediately after the creation. The laser marker L is operated based on the setting content that has been referred to, and executes printing on each of the workpieces W flowing on the line (Step S3). Specifically, a PLC 902 inputs a trigger to the marker controller 100 each time each of the workpieces W is conveyed to the vicinity of the marker head 1. The marker controller 100 executes a printing sequence on each of the workpieces W each time the trigger is input. The printing sequence referred to herein indicates an operation for performing printing on each of the workpieces W (for details, see FIG. 11). The marker controller 100 executes the printing sequence for each of the workpieces W to be printed.

When the printing on all the workpieces W is completed, the marker controller 100 outputs the print log Lg in which the printing results are arrayed in a time-series manner (Step S4). The print log Lg can be configured using a general text file, and is stored in various storage media including the condition setting storage section 102. The print log Lg can be generated in real time in parallel with the process of Step S3. The marker controller 100 outputs the print log Lg thus generated to the external terminal 700 which is the diagnosis support apparatus.

(Specific Procedure for Creating Each Setting)

FIG. 8 illustrates a specific process in Step S1 of FIG. 7.

First, in Step S11, the coaxial camera 6 or the whole camera 7 built in the laser marker L generates the captured image Pw including at least a part of the printing area R1.

The captured image Pw generated by the coaxial camera 6 or the whole camera 7 is output to the operation terminal 800.

The display section 801 of the operation terminal 800 displays the setting plane R4 associated with the printing area R1 and also displays the captured image Pw on the setting plane R4 (see FIGS. 9 and 10).

As a result, a coordinate system (printing coordinate system) defined on the setting plane R4 in the display section 801 and a coordinate system (camera coordinate system) defined on the captured image Pw can be associated with each other. For example, a user can perform printing on the printing area R1 through the setting plane R4 by designating a printing point while looking at the captured image Pw. The captured image Pw functions as a background image at the time of performing various settings through the setting plane R4.

In the subsequent Step S12, the setting section 107 sets printing conditions. The setting section 107 sets the printing conditions by reading a storage content in the condition setting storage section 102 or the like, or by reading an operation input or the like via the operation terminal 800.

As an example of the printing conditions, the setting section 107 sets a printing pattern (marking pattern) Pm, which indicates a printing content to be formed in the printing area R1, on the surface of the workpiece W. The setting of the printing pattern Pm is executed via the setting plane R4.

The printing conditions include not only the printing pattern Pm, which is the marking pattern, but also a printing block B indicating a position of this printing pattern Pm. The printing block B can be used to adjust a layout, a size, a rotation posture, or the like of the printing pattern Pm. Further, the printing block B is used in association with a distance measurement position I to be described later.

The display section 801 can display the printing pattern Pm and the printing block B to overlap with the captured image Pw. For example, in FIG. 10, the printing pattern Pm including a character string "123" and the rectangular printing block B surrounding the printing pattern Pm are arranged on the setting plane R4 on the surface of the workpiece W. The display section 801 displays the printing pattern Pm and the printing block B arranged in this manner to overlap with the captured image Pw.

Although not illustrated, a plurality of workpiece Ws may be displayed on the setting plane R4, and only one workpiece W may be displayed as illustrated in FIG. 10. Further, a plurality of printing blocks B may be arranged on one workpiece W. Regarding the printing pattern Pm, a pattern other than a character string such as a bar code and a QR code can be also used.

Returning to Step S12 in FIG. 8, for example, a user manually creates the printing block B and arranges this printing block B on the setting plane R4 in the same step. Since the setting plane R4 and the captured image Pw are associated with each other as described above, the user can arrange the printing block B while visually recognizing the captured image Pw.

When one or a plurality of printing blocks B are arranged in this manner, the user determines the printing pattern Pm per printing block B. The printing pattern Pm is determined, for example, as the user operates the operation section 802 and the operation section 802 inputs the printing pattern Pm to the marker controller 100 based on the operation input at that time.

The setting section 107 reads the printing blocks B thus arranged and the printing pattern Pm determined per printing block B to be set as the printing conditions. The setting section 107 according to this embodiment temporarily or consistently stores coordinates (coordinates in the printing coordinate system) of the printing block B on the setting plane R4 and the like in the condition setting storage section 102 and the like.

The printing conditions also include conditions related to printing laser light (hereinafter referred to as "laser conditions"). These laser conditions include at least one of an emission position of the printing laser light, a target output (laser power) of the printing laser light, a scanning speed (scan speed) of the printing laser light by the laser light scanning section 4, a repetition frequency (pulse frequency) of the printing laser light, whether a laser spot of the printing is laser light variable (spot variability), and the number of times the printing laser light traces the printing pattern Pm (number of printing times). As illustrated in a menu D1 displayed at the lower right of FIG. 10, such printing conditions can be set per printing block B.

In general, misalignments occur in the X direction and the Y direction (XY direction) among the respective workpieces W to be sequentially processed when the manufacturing line is operated. The laser marker L according to this embodiment can correct such a misalignment using various methods.

Therefore, in Step S13 subsequent to Step S12, the setting section 107 creates condition settings (search settings) to correct the misalignments in the XY directions. The laser marker L according to this embodiment can use a pattern search, for example, as a method for correcting the misalignments in the XY directions.

In the case of using the pattern search, the setting section 107 sets a pattern area (not illustrated) for identifying a position of the workpiece W and a search area (not illustrated) defined as a movement range of the pattern area (not illustrated) on the captured image Pw as conditions (search conditions) related to the pattern search.

The search conditions set by the marker controller 100 are stored in the condition setting storage section 102 or the like as the search settings. When the creation of the search setting is completed, the control process proceeds from Step S13 to Step S14.

In general, a misalignment occurs in the Z direction among the respective workpieces W to be sequentially processed when the manufacturing line is operated. Such a misalignment causes a shift of a focal position of printing laser light, which is not desirable. The laser marker L according to this embodiment includes the distance measuring unit 5, and thus, can detect the misalignment in the Z direction based on the distance to the surface of the workpiece W. As a result, it is possible to correct the misalignment in the Z direction, and further, the shift of the focal position. Therefore, in Step S14 subsequent to Step S13, the condition settings (distance measurement settings) to correct the misalignment in the Z direction are created.

Specifically, in Step S14, conditions (distance measurement conditions) related to the distance measuring unit 5 are determined. The setting section 107 according to this embodiment sets at least the distance measurement position I for measurement of the distance from the marker head 1 particularly from the housing 10 to the surface of the workpiece W on the captured image Pw as the distance measurement condition (see the star mark in FIG. 10). The distance measurement position I is basically set so as to overlap with the surface of the workpiece W, and indicates coordinates to which distance measuring light needs to be emitted.

When a plurality of printing blocks B are set, the setting section 107 can set the distance measurement condition per printing block B. In this case, the setting section 107 can set the distance measurement position I within each of the printing blocks B (see the star mark in FIG. 10). Instead, the setting section 107 may set the distance measurement position I outside each of the printing blocks B.

The distance measurement conditions set by the setting section 107 are stored in the condition setting storage section 102 or the like as the distance measurement settings. When the creation of the distance measurement setting is completed, the control process proceeds from Step S14 to Step S15 and returns.

(Execution of Printing)

FIG. 11 illustrates a specific process in Step S3 of FIG. 7. That is, the process illustrated in FIG. 11 is sequentially executed for the respective workpieces W that flow when the manufacturing line is operated.

First, prior to the respective steps illustrated in FIG. 11, the marker controller 100 creates settings such as the printing pattern Pm and the printing block B (printing settings), settings such as the pattern image (search settings), and settings such as the distance measurement position I (distance measurement settings) in advance for a predetermined workpiece W as described with reference to Step S1 in FIG. 7 and Steps S11 to S15 in FIG. 8.

When the creation of each setting is completed, the marker controller 100 is in the state of being capable of executing a control process illustrated in FIG. 11. This control process includes, as the main processes, a control process (Steps S31 to S33) configured to execute XY tracking (detection of misalignments in the XY direction) and Z tracking (measurement of the height in the Z direction) and a control process (Steps S34 to S39) configured to execute printing reflecting the XY tracking and the Z tracking and storing a printing result thereof.

First, a trigger is input from the PLC 902 or the like to the marker controller 100 in Step S31 of FIG. 11. At this time, a workpiece W of the same type as the workpiece W used for various settings including distance measurement setting is conveyed. When the trigger is input to the marker controller 100, the marker controller 100 writes a fact that a printing sequence has started in the print log Lg. When writing in the print log Lg, serial numbers to distinguish printing sequences may be added, for example, as indicated by reference signs N1 and N2 in FIG. 12, for example.

In Step S31, the marker controller 100 captures an image of the workpiece W of the same type via the coaxial camera 6 or the whole camera 7 to generate a captured image (camera image) Pw. The marker controller 100 displays the generated captured image Pw to overlap with the setting plane R4. At that time, the marker controller 100 sets a file path configured to associate the workpiece W before printing with the captured image Pw generated by capturing an image of the workpiece W as a "pre-printing camera image file path". The marker controller 100 writes the file path set in this manner in the print log Lg per printing sequence (see FIG. 12).

In the subsequent Step S32, the marker controller 100 reads the search settings (search conditions) for each of the printing blocks B to be searched, and executes the XY tracking using the pattern search based on the search settings. This process is executed by the image processing section 104.

Specifically, the image processing section 104 executes the pattern search on the captured image Pw in Step S32. As a result, the image processing section 104 can identify a position of the workpiece W on the captured image Pw when viewed along the printing area R1 (that is, when viewed along the XY plane). Note that the position of the workpiece W referred to herein is a relative position of the workpiece W as a target of execution of the XY tracking with respect to the workpiece W used to create the search settings. This relative position is nothing but the misalignment of the workpiece W in the XY directions.

When the image processing section 104 executes the XY tracking in this manner, the misalignment in the XY directions between the workpiece W used to create the printing settings, the search settings, and the distance measurement settings and the workpiece W' newly conveyed during the operation is detected. At that time, the marker controller 100 writes the misalignment amount of the workpiece W in the XY directions in the text log Lg per printing sequence as a "XY tracking result" (see FIG. 12).

In Step S32, the marker controller 100 reads the distance measurement settings (distance measurement conditions) for each of the printing blocks B set as distance measuring targets, and also executes the Z tracking using the distance measuring unit 5 based on the distance measurement settings. Specifically, in Step S32, the distance measurement section 103 operates the distance measuring unit 5 to measure the distance from the marker head 1 to the distance measurement position I and further the height of the workpiece W at the distance measurement position I. At that time, the marker controller 100 writes the measured height of the workpiece W in the text log Lg per printing sequence as a "Z tracking result" (see FIG. 12).

In Step S32, the marker controller 100 corrects the misalignment of the workpiece W in the XY directions based on the detection result of the misalignment in the XY directions. Specifically, the marker controller 100 corrects the position of the printing block B on the setting plane R4 so as to reduce the misalignment of the workpiece W in the XY directions.

In Step S32, the marker controller 100 corrects the misalignment of the workpiece W in the Z direction based on the measurement result of the height of the workpiece W. Specifically, the marker controller 100 corrects the focal position of the printing laser light based on the misalignment of the workpiece W in the Z direction.

In this manner, the misalignment of the printing block B in the XYZ directions is corrected for each of the workpieces W conveyed along with the operation of the manufacturing line in Step S32.

In the subsequent Step S33, the marker controller 100 determines details of the printing pattern Pm. The information determined in Step S33 includes a manufacturing date, an expiration date, a lot number, a count value, and information that is fixed during the actual operation (in particular, timing after trigger input).

Further, the laser marker L according to this embodiment has a function of allowing the user to confirm the printing pattern Pm formed by the marker head 1 and a function to determine the pass/fail of the printing pattern Pm.

In order to implement those functions, it is required to capture an image of the actually formed printing pattern Pm by the coaxial camera 6 or the whole camera 7. In particular, it is required to generate at least the captured image Pw including the entire printing pattern Pm in order to determine the pass/fail of the printing pattern Pm. At least an index indicating an area that needs to be captured is required in order to capture an image of the entire printing pattern Pm.

Therefore, in Step S34 subsequent to Step S33, the marker controller 100 sets an imaging area indicating an area that needs to be captured. Specifically, the marker controller 100 defines the imaging area including the printing pattern Pm on the surface of the workpiece W. The marker controller 100 also sets a position and a size of the imaging area thus defined, and temporarily or consistently stores these in the condition setting storage section 102.

In Step S35 subsequent to Step S34, the marker controller 100 executes printing with the marker head 1. As the printing is executed, the printing pattern Pm determined in detail in Step S33 is formed on the surface of the workpiece W to be marked.

Then, in Step S36 subsequent to Step S35, the marker controller 100 selects one of the coaxial camera 6 and the whole camera 7 and captures the above-described imaging area using the camera thus selected. As a result, the captured image Pw including the entire printing pattern Pm is acquired. At that time, the marker controller 100 sets a file path configured to associate the workpiece W after printing with the captured image Pw generated by capturing an image of the workpiece W as a "post-printing camera image file path". The marker controller 100 writes the file path set in this manner in the print log Lg per printing sequence (see FIG. 12).

Next, in Step S37 subsequent to Step S36, the marker controller 100 determines the pass/fail of the printing that has been applied to the workpiece W using the captured image Pw acquired in Step S36.

Specifically, in Step S37, the pass/fail determination section 105 determines that the quality of the printing is favorable (OK determination) or that the quality of the printing is poor (NG determination) based on the printing pattern Pm formed on the surface of the workpiece W. These determinations can be executed using various methods according to types of the printing pattern Pm.

For example, in the case of marking a two-dimensional code such as a QR code as the printing pattern Pm, the pass/fail determination section 105 evaluates the quality using the print quality evaluation standard (AIM DPM) established by the Automatic Identification Manufacturers (AIM). In this evaluation standard, overall grades are defined in six stages from "A" to "F" in order from the high evaluation side, and the print quality is evaluated higher as the overall grade increases. The condition setting storage section 102 assigns one of the overall grades of "A" to "F" to each of the printing patterns Pm.

Further, the condition setting storage section 102 stores, in advance, a threshold (threshold rank) of an overall grade that defines a boundary between the OK determination and the NG determination. The pass/fail determination section 105 compares the threshold rank with the overall grade assigned to each of the printing patterns Pm to make the OK determination or the NG determination per printing pattern Pm. For example, when the threshold rank is set to "C", the pass/fail determination section 105 makes the OK determination for the printing pattern Pm to which the overall grade of "A" or "B" has been assigned, and makes the NG determination for the printing pattern Pm to which the overall grade of "C", "D", "E" or "F" has been assigned.

On the other hand, in the case of marking a character string as the printing pattern Pm, the pass/fail determination section 105 evaluates the pass/fail of each of the printing patterns Pm based on a difference between the captured images Pw. Specifically, the pass/fail determination section 105, for example, generates a difference image between the captured image Pw generated immediately before printing and the captured image Pw generated immediately after printing per printing sequence. Next, the pass/fail determination section 105 calculates a score (hereinafter, referred to as "printing score") by calculating a difference between the difference image and a printing image generated from the printing settings (a setting image of the printing pattern Pm). In a case where the difference between the difference image and the printing image is large, the printing score is smaller (lower evaluation) than that in a case where the difference is small. In this embodiment, the printing score is calculated within the range between 0 and 100.

Further, in the condition setting storage section 102, a printing score threshold (threshold score) that defines a boundary between the OK determination and the NG determination is defined in advance. The pass/fail determination section 105 makes the OK determination or the NG determination per printing pattern Pm by comparing the threshold score with the printing score regarding each of the printing patterns Pm. For example, when the threshold score is set to "50", the pass/fail determination section 105 makes the OK determination for the printing pattern Pm for which a printing score exceeding 50 has been calculated, and makes the NG determination for the printing pattern Pm for which a printing score of 50 or less has been calculated.

Note that the condition setting storage section 102 can also be executed by combining a plurality of types of determination methods. For example, in the case of marking a two-dimensional code as the printing pattern Pm, the pass/fail determination section 105 executes both the determination using the overall grade and the determination using the printing score. In this case, the pass/fail determination section 105 makes the NG determination when the overall grade is "C", "D", "E" or "F" or when the printing score is 50 or less.

In Step S37, the marker controller 100 writes a pass/fail determination result of each workpiece in the print log Lg per printing sequence as a "printing confirmation result" (see FIG. 12). Here, the marker controller 100 may write the above-described overall grade and/or printing score in the print log Lg or write only information indicating the OK determination or the NG determination in the print log Lg, as the pass/fail determination result.

Next, in Step S38 subsequent to Step S37, the marker controller 100 emits the distance measuring light from the distance measuring unit 5 to detect a stain on the light-transmissive window 19. This process is executed by the stain detection section 106.

Specifically, the stain detection section 106 identifies distance measuring light caused by reflected light from the light-transmissive window 19 out of distance measuring lights received by the distance measuring light receiving section 5B to detect the stain on the light-transmissive window 19.

As described above, the light-transmissive window 19 is fixed to the housing 10. Therefore, an optical path length between the light-transmissive window 19 and the distance measuring light emitting section 5A is known. Since the optical path length is known, a position where the distance measuring light reflected by the surface of the light-transmissive window 19 has a peak on the light receiving surfaces of the pair of light receiving elements 56L and 56R can be estimated in advance. The stain detection section 106 detects the degree of the stain on the light-transmissive window 19 by monitoring a light reception status (for example, a light reception amount) at the light reception position that is estimated to have the peak. This detection result (the degree of the stain) is written in the print log Lg per printing sequence as a "post-printing window monitoring result".

Next, in Step S39 subsequent to Step S38, the marker controller 100 detects the output of printing laser light using the power monitor 21c. This detection result is written in the print log Lg per printing sequence as "laser power".

When the printing on all the workpieces W is completed, the marker controller 100 ends the process of Step S3 and starts the process of Step S4.

(Output of Print Log)

In Step S4, the marker controller 100 inputs the print log Lg to the external terminal 700. The print logs Lg are grouped each time a trigger is input. Since the printing sequence is started each time the trigger is input as described above, pieces of state information can be divided per workpieces W and arranged in a time-series order with such grouping. In the example illustrated in FIG. 12, the print log Lg includes a group G1 corresponding to a first printing sequence and a group G2 corresponding to a second printing sequence.

In addition, the print log Lg can associate the pass/fail determination result regarding each printing, the captured image Pw used to acquire each determination result, and a plurality of types of state information at the time of acquiring each determination result with each other through the above-described "printing confirmation result", "post-printing camera image file path", and the state information such as the "XY tracking result".

Here, the "state information" refers to information indicating a state of the laser marker L. The plurality of types of state information can include at least one or more of the position of the workpiece W (XY tracking result) identified by the image processing section 104, the distance to the workpiece W (Z tracking result) measured by the distance measuring unit 5, the stain detected by the stain detection section 106 after performing the printing (post-printing window monitoring result), and the output of the printing laser light (laser power result) detected by the power monitor 21c. In the example illustrated in FIG. 12, the plurality of pieces of state information include all of these pieces of information.

In this manner, the print log Lg is configured in the state where the pass/fail determination result of each printing when the printing is executed on the plurality of workpieces W, the captured image Pw used to acquire each determination result, and the plurality of types of state information at the time of acquiring each determination result are associated with each other and arranged in a time-series order. The print log Lg is an example of "history information" in this embodiment.

The external terminal 700 supports the diagnosis of the laser marker L based on the print log Lg input from the marker controller 100. Hereinafter, a configuration of the external terminal 700 which is the diagnosis support apparatus will be described in detail.

<Diagnosis Support Apparatus>

Figure 13:
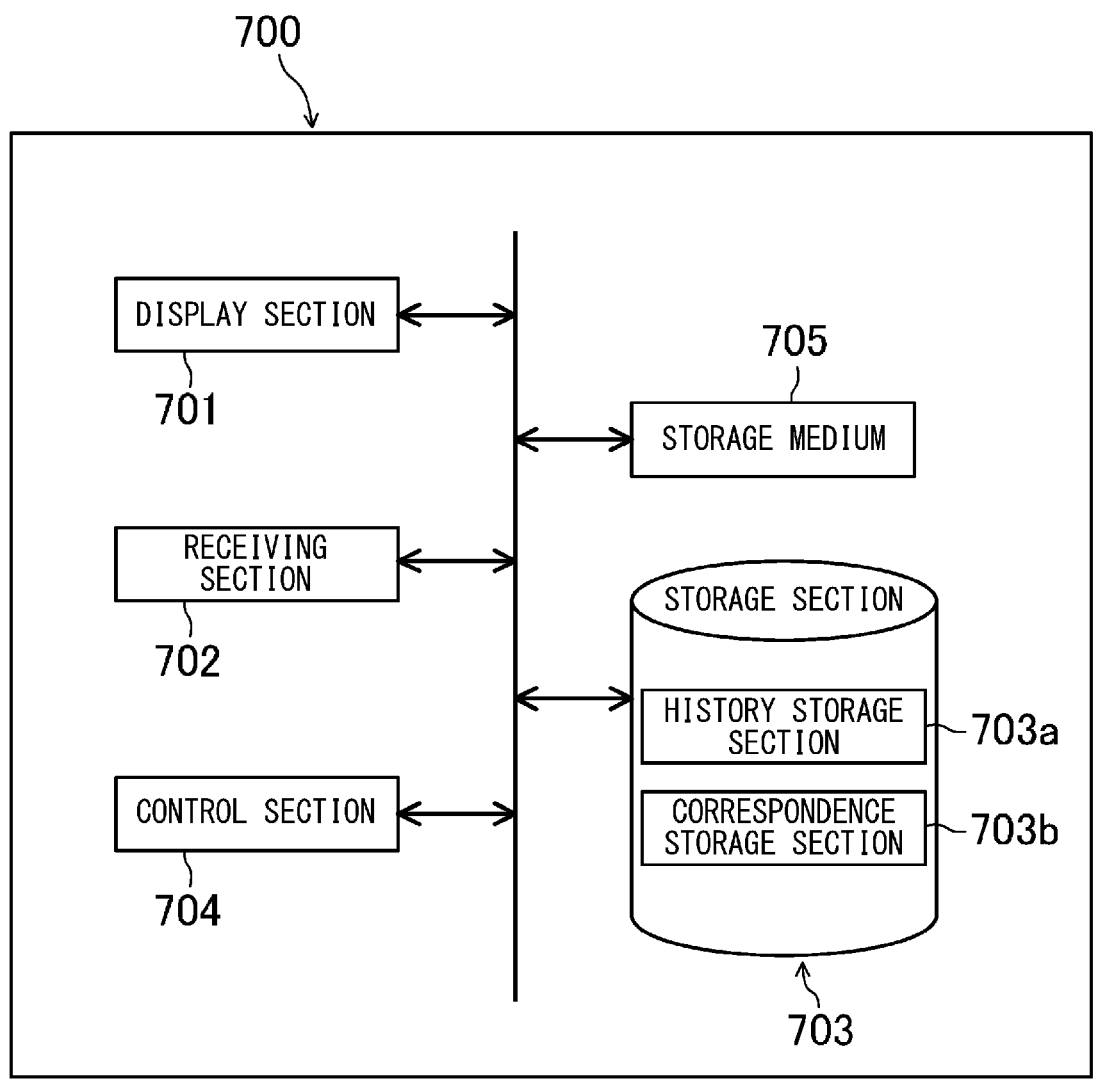
FIG. 13 is a block diagram illustrating a schematic configuration of a diagnosis support apparatus.
Figure 14:
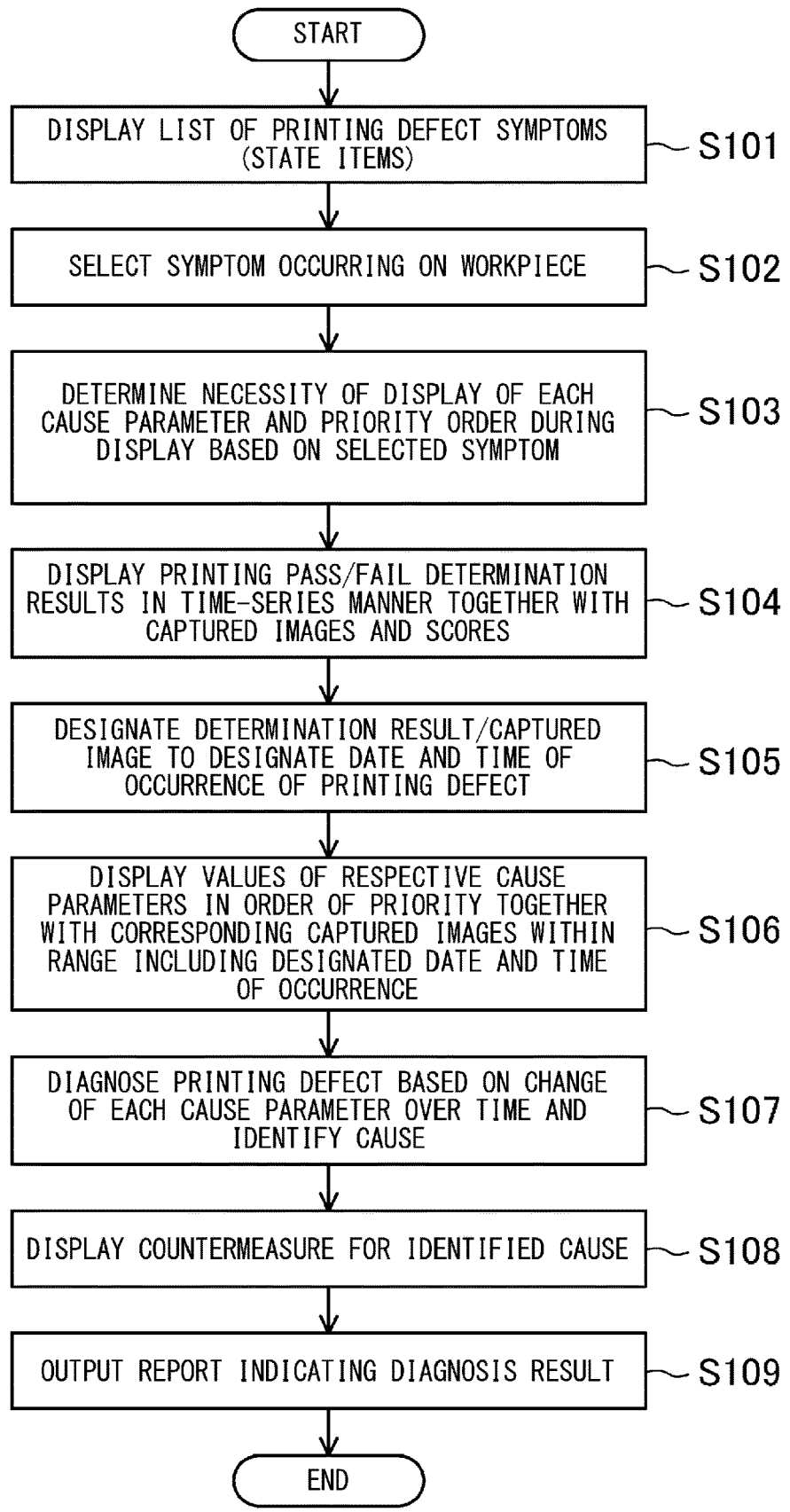
FIG. 14 is a flowchart illustrating a specific procedure of a diagnosis support method.
Figure 15A:
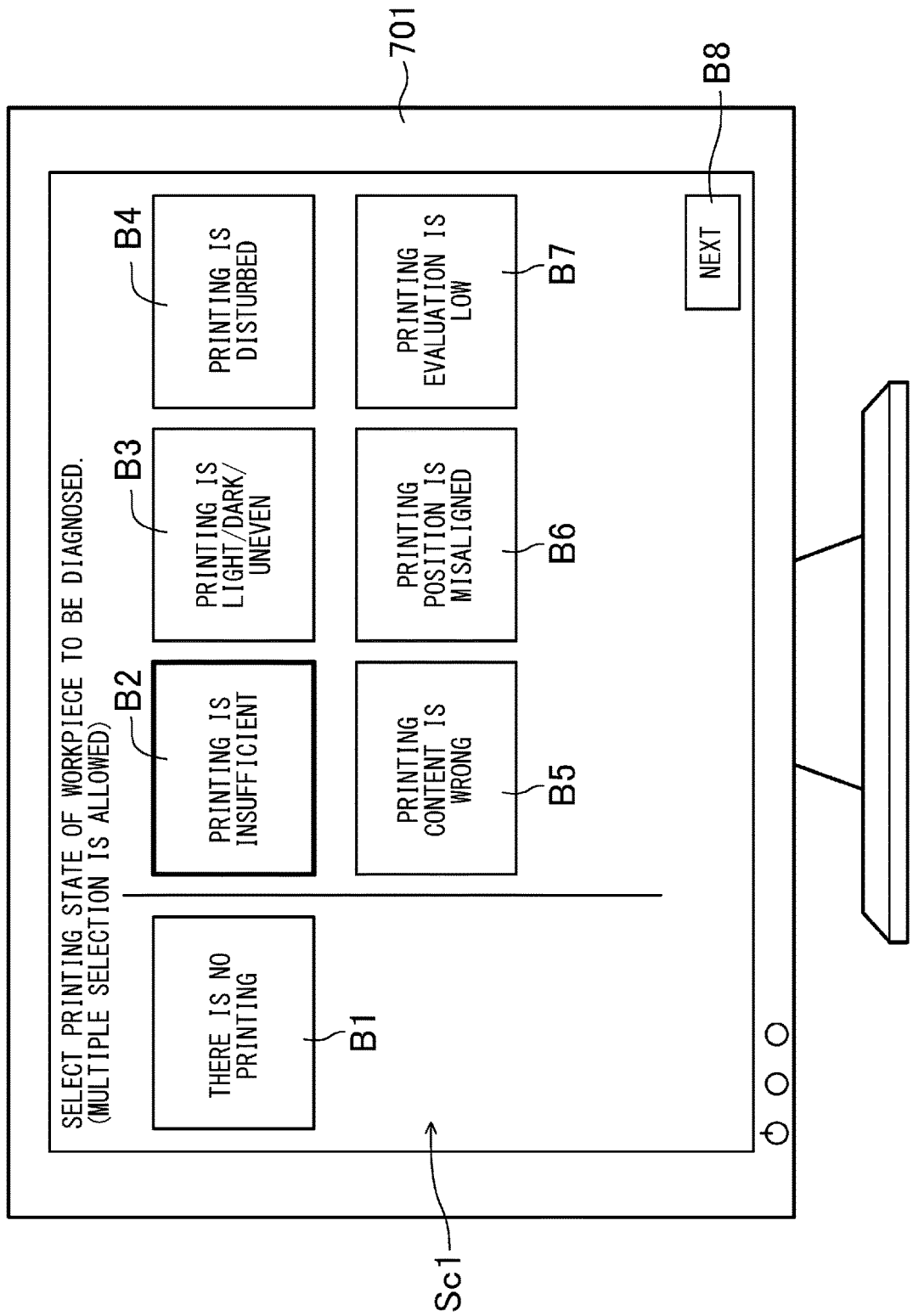
FIG. 15A is a view illustrating a selection screen of a symptom of a printing defect.
Figure 15B:
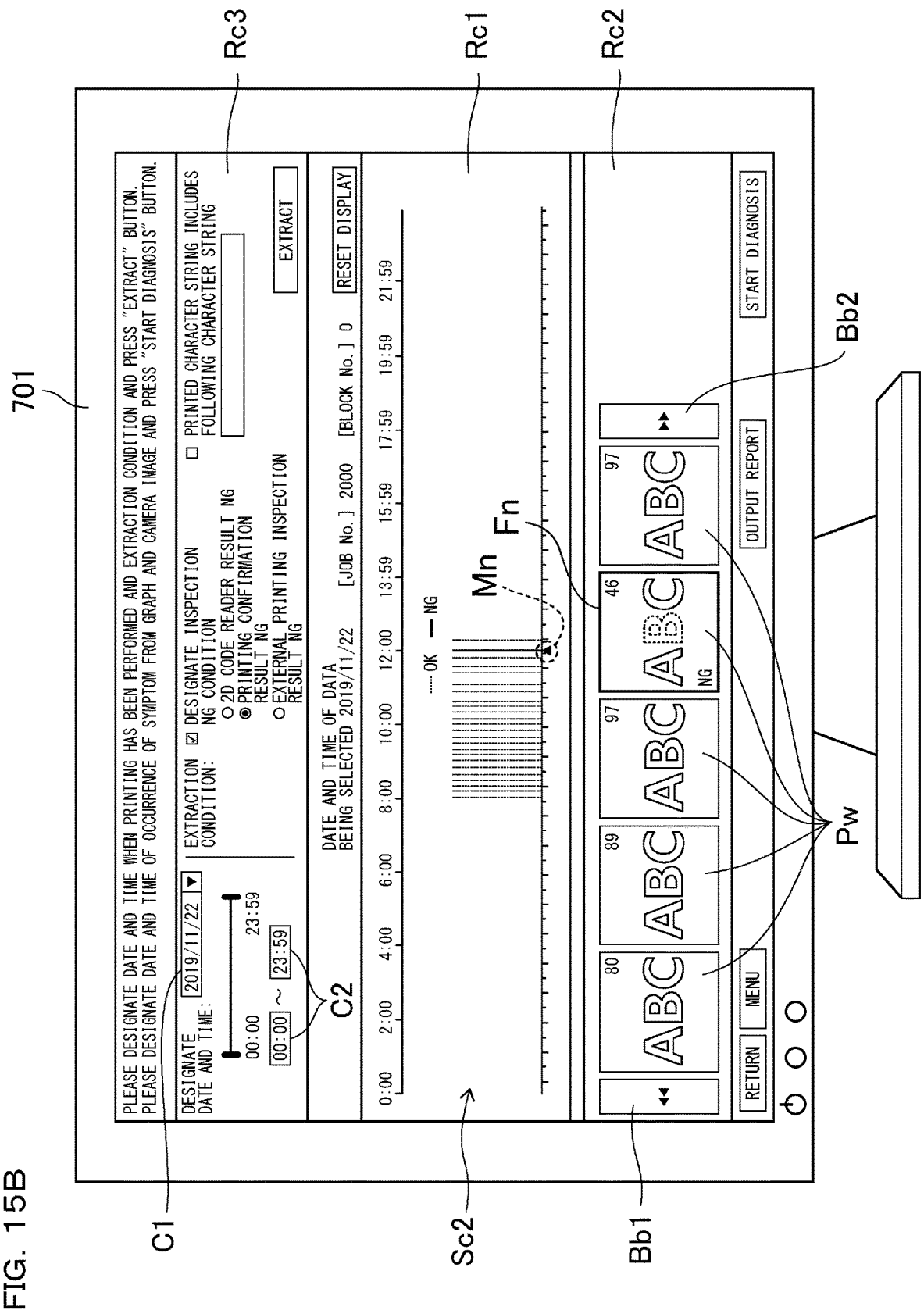
FIG. 15B is a view illustrating a designation screen of the date and time of occurrence of the printing defect.
Figure 15D:
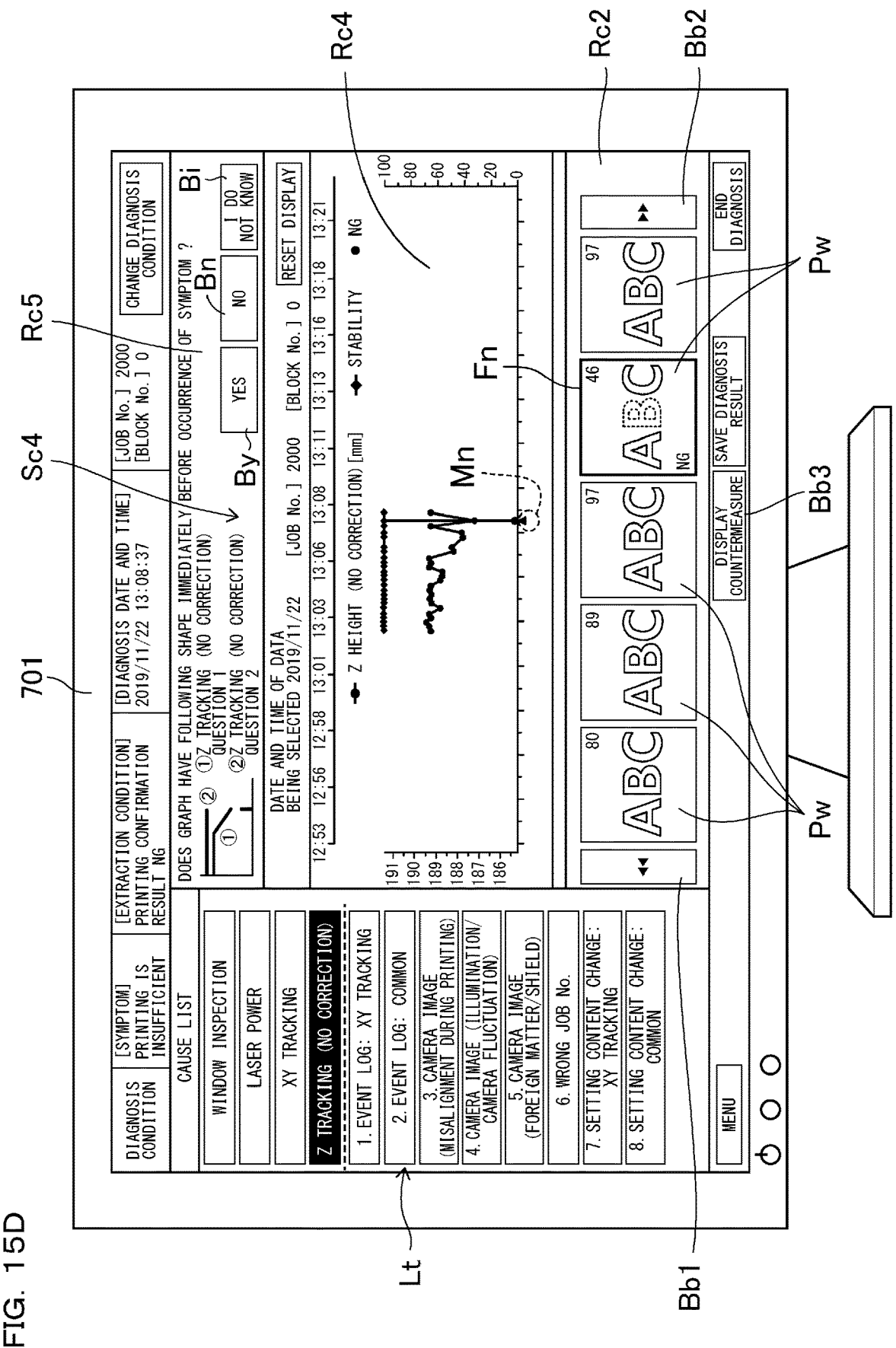
FIG. 15D is a view illustrating a diagnosis screen of the printing defect.
Figure 15E:
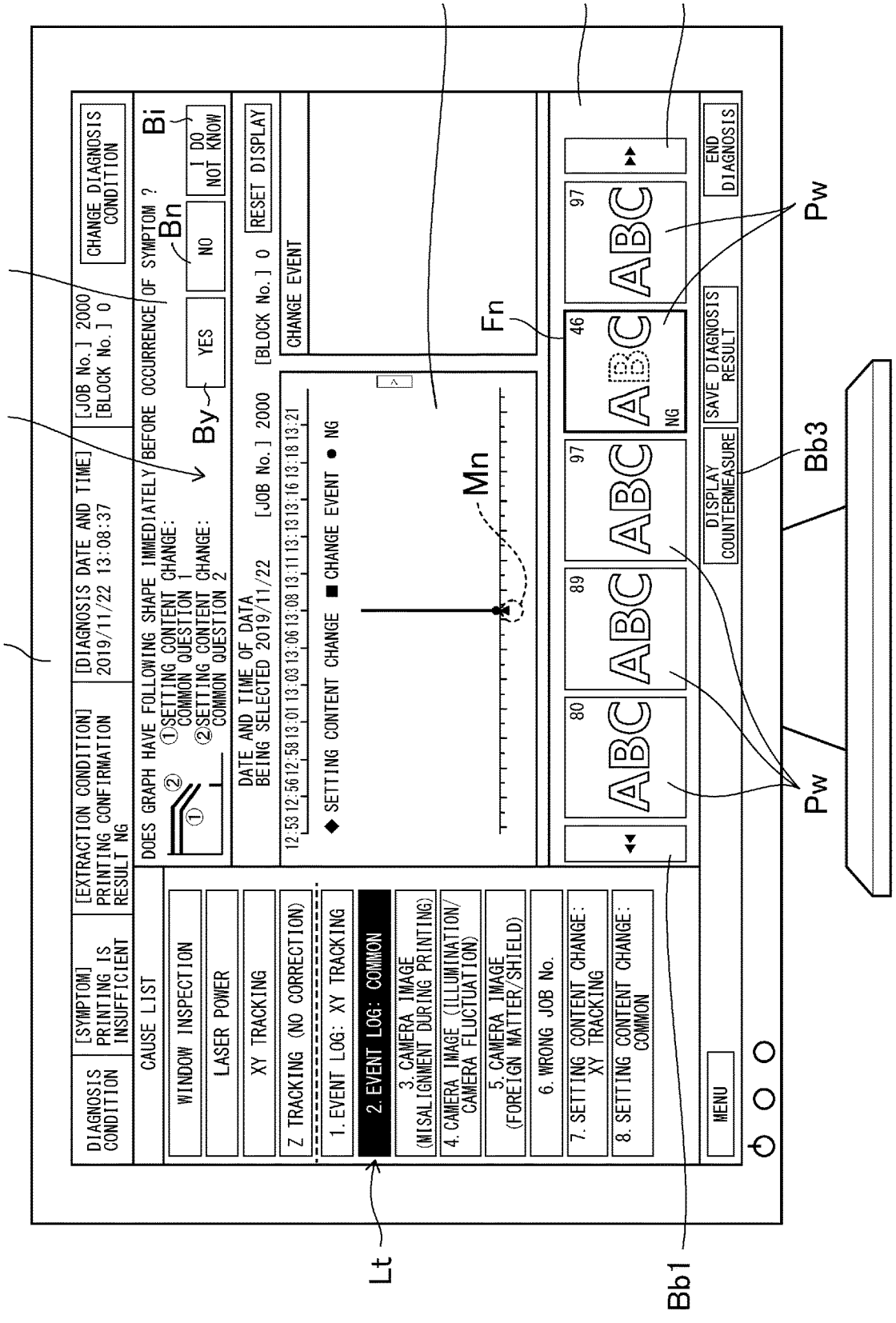
FIG. 15E is a view illustrating a diagnosis screen of the printing defect.
Figure 15F:
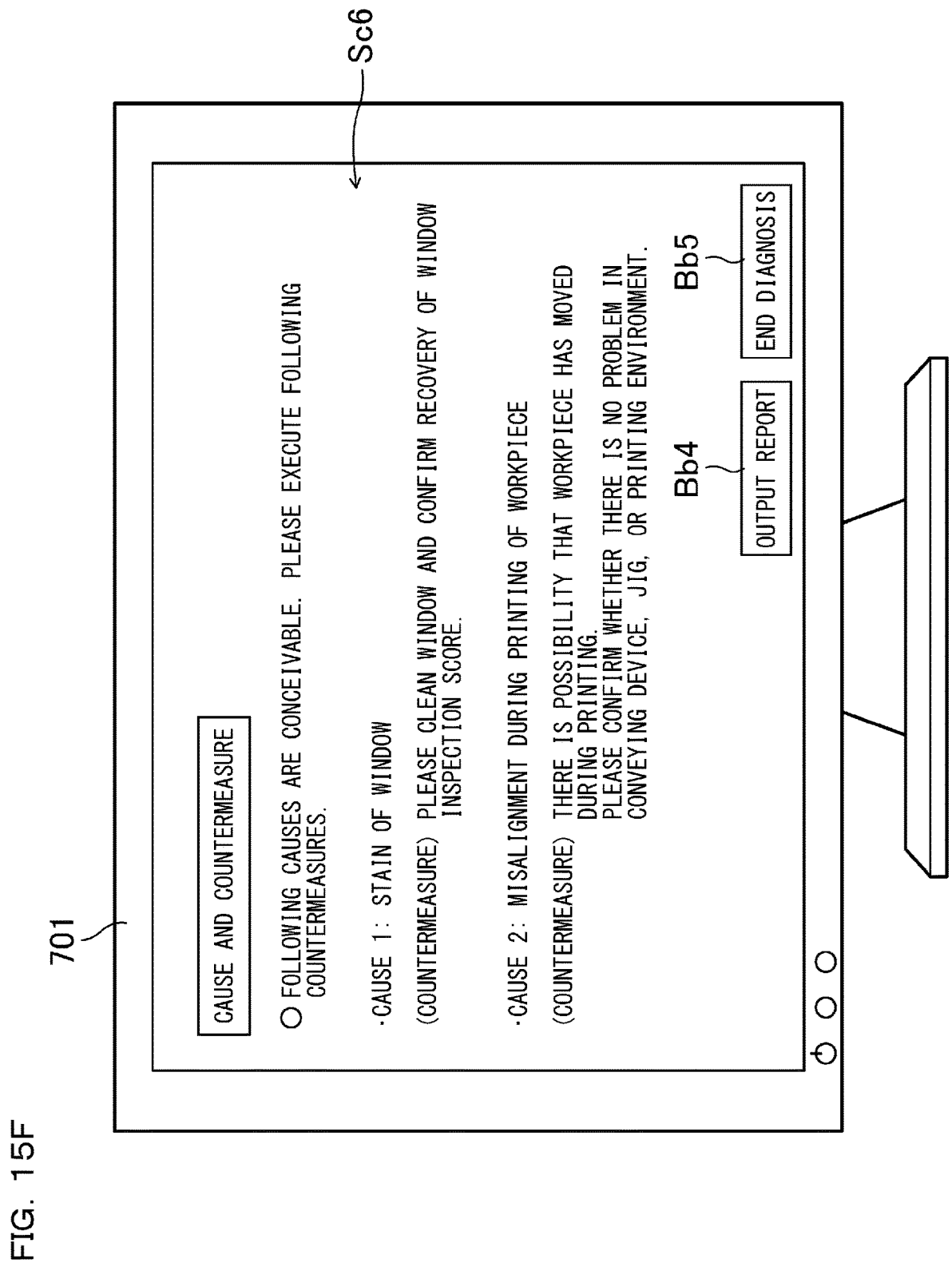
FIG. 15F is a view illustrating a screen of a countermeasure for solving the printing defect.

FIG. 13 is a block diagram illustrating a schematic configuration of the external terminal (diagnosis support apparatus) 700. FIG. 14 is a flowchart illustrating a specific procedure of a diagnosis support method. Further, FIG. 15A is a view illustrating a selection screen Sc1 of a symptom of a printing defect. FIG. 15B is a view illustrating a designation screen Sc2 of the date and time of occurrence of the printing defect. FIG. 15C is a view illustrating a diagnosis screen Sc3 of the printing defect. FIG. 15D is a view illustrating a diagnosis screen Sc4 of the printing defect. FIG. 15E is a view illustrating a diagnosis screen Sc5 of the printing defect. FIG. 15F is a view illustrating a countermeasure screen Sc6 to solve the printing defect. FIG. 16 is a table illustrating an example of a relationship between a cause of printing defect and a display priority order.

(External Terminal 700)

The external terminal 700 is configured using, for example, a personal computer, and is connected to the marker controller 100 in a wired or wireless manner. The external terminal 700 functions as the diagnosis support apparatus configured to support the diagnosis of a printing defect that has occurred on the workpiece W by executing the diagnosis support method to be described later.

Specifically, the external terminal 700 receives an operation to select a specific symptom of a printing defect and displays a cause of the printing defect to a user according to the selected symptom in order to support the diagnosis of the printing defect occurring on the workpiece W during printing by the laser marker L.

Specifically, the external terminal 700 includes: a display section 701 that displays information to the user; a receiving section 702 that receives an operation from the user; a storage section 703 that stores various types of information; and a control section 704 that controls at least the display section 701.

Among these, the display section 701 is configured using, for example, a liquid crystal display or an organic EL panel. The display section 701 displays the selection screen Sc1 configured to select the symptom of the printing defect, or the diagnosis screen Sc5 configured to diagnose the printing defect.

The receiving section 702 is configured using, for example, a keyboard and/or a pointing device. Here, the pointing device includes a mouse and/or a joystick. The receiving section 702 is configured to receive an operation input from the user, and is used for selection of a symptom on the selection screen Sc1 or the like.

The storage section 703 is configured using, for example, a hard disk drive or a solid state drive as a secondary storage apparatus. The storage section 703 includes a history storage section 703a and a correspondence storage section 703b, which will be described later, as functional elements.

The control section 704 has a CPU, a memory, and an input/output bus. The control section 704 executes various programs to control various sections constituting the external terminal 700 such as the display section 701.

Further, the external terminal 700 can read a storage medium 705 that stores a program. In particular, the storage medium 705 according to this embodiment stores a diagnosis support program obtained by programming the diagnosis support method. This diagnosis support program is read and executed by the control section 704. The external terminal 700 functions as the diagnosis support apparatus as the control section 704 executes the diagnosis support program.

—History Storage Section 703a—

The history storage section 703a stores the print log Lg sent from the laser marker L as history information. The history storage section 703a stores the print log Lg at a timing that is at least earlier than the diagnosis of a printing defect.

Further, the history storage section 703a stores determination results obtained by the pass/fail determination section 105 as many as the number of workpieces W for which printing has been executed. In particular, when the printing defect is actually diagnosed, the history storage section 703a stores a plurality of determination results including at least an NG determination result. The history information stored in the history storage section 703a can be displayed on the display section 701.

In particular, the history storage section 703a according to this embodiment is configured to store not only the NG determination result but also an OK determination result. Specifically, the history storage section 703a according to this embodiment stores at least a plurality of OK determination results among the determination results obtained by the pass/fail determination section 105, the captured images Pw used for acquisition of the respective OK determination results, and a plurality of pieces of state information during the acquisition of the respective OK determination results among the plurality of pieces of state information as the history information in a time-series order in the state of being associated with each other. This process can be regarded as one of steps constituting the diagnosis support method according to this embodiment.

—Correspondence Storage Section 703b—

The correspondence storage section 703b stores a correspondence between a state item indicating a state of a printing defect occurring on the workpiece W and a plurality of cause parameters which are cause candidates of the printing defect corresponding to this state item together with display priority order of the plurality of cause parameters.

Here, the "state items" indicate items in which symptoms of the printing defects are classified as illustrated in FIG. 15A, for example. The "state item" may be an item perceivable by the user or an item not perceivable by the user.

Examples of the state items corresponding to the former include symptoms such as "not printed", "printing is insufficient", "printing is dark, printing is light, printing has unevenness", "printing is disturbed", "a printing content is incorrect", and "the printing position is misaligned". On the other hand, the state items corresponding to the latter include items indicating symptoms such as "the overall grade, the printing score, and the like are low".

Further, the "cause parameter" indicates a parameter indicating the possibility of causing the printing defect for each state item. As the cause parameter, for example, the state information of the laser marker L can be used. At least two or more cause parameters are set.

Specifically, as illustrated in FIG. 16, the cause parameters according to this embodiment include the output of laser light detected by the power monitor 21c (laser power), the stain of the light-transmissive window 19 detected by the stain detection section 106 (window inspection), the distance to the workpiece W measured by the distance measuring unit 5 (Z tracking result), and the position of the workpiece W identified by the image processing section 104 (XY tracking result). Values of these parameters can be read from the print log Lg stored in the history storage section 703a. For example, the value of the laser power corresponds to a value of a "laser power result" in FIG. 12, and the value of the window inspection corresponds to a value of a "post-printing window inspection result" in FIG. 12.

It can be said that these four cause parameters are parameters characterizing the cause of the printing defect, rather than indicating the cause itself. In such a sense, these cause parameters can be regarded as parameters indicating "superficial causes". In addition, among the four cause parameters, the laser power and window inspection are determined such that the laser marker L itself is the cause of the printing defect, and the Z tracking result and the XY tracking result are determined such that causes other than the laser marker L, such as a conveying device of the workpiece W, a jig of the workpiece W, and a shape of the workpiece W itself, have caused the printing defect.

Further, the cause parameters according to this embodiment include not only parameters that change over time, such as laser power, but also parameters indicating whether a specific event has occurred, for example, "whether the printing settings have been changed", "whether foreign matter has been reflected in the captured image Pw", and the like.

For example, as illustrated in FIG. 16, the latter type of parameters include "whether a specific event has occurred (event log)", "whether a job number is wrong (wrong job number)", "whether the printing settings have been changed (setting content change)", "whether the captured image Pw has been misaligned during printing (camera image: misalignment during printing)", "whether a use status of a camera, an illumination, or the like has fluctuated, such as a fluctuation of the brightness of the captured image Pw (camera image: illumination/camera fluctuation)", "whether foreign matter, a shield, or the like has been reflected in the captured image Pw (camera image: foreign matter/shield)", "whether other events, such as power down of printing laser light, have occurred (others)" and the like.

It can be said that these seven cause parameters are parameters indicating the cause of the printing defect itself, or parameters closely related to the cause. In such a sense, these cause parameters can be regarded as parameters indicating "root causes". Further, among the seven cause parameters, the event log, the wrong job number, and the setting content change are determined such that the cause of the printing defect is user's operation error, an operation of the PLC 902, or the like, and the other four cause parameters are determined such that the printing defect has been caused due to other environmental causes.

Each state item is associated with a plurality of cause parameters. As will be described later, the external terminal 700, which is the diagnosis support apparatus, displays a cause parameter corresponding to a symptom when the user designates the symptom of the printing defect as the state item.

Therefore, the correspondence storage section 703*b* stores at least whether to display each of the plurality of cause parameters on the display section 701 as the correspondence between each state item and the plurality of cause parameters.

That is, a cause parameter, which is considered to have a strong correlation with a symptom, is displayed on the display section 701 to instruct the user. On the other hand, a cause parameter, which is considered to have a weak correlation with the symptom, is not displayed on the display section 701 so as not to instruct the user. As a result, an unnecessary cause parameter can be excluded from a diagnosis target, and thus, the usability can be improved at the time of diagnosing the printing defect.

Specifically, it is considered a case where attention is paid to "a printing position is misaligned" as an example of the state item. Intuitively, it is considered that this symptom has a strong correlation with the XY tracking, but a weak correlation with the laser power. Therefore, the correspondence storage section 703*b* sets a relationship for XY tracking to be displayed on the display section 701 and sets a relationship for the laser power not to be displayed on the display section 701 (see also FIG. 16) as the correspondence between the symptom "the printing position is misaligned" and the plurality of cause parameters.

Further, the correspondence storage section 703*b* stores a priority order (display priority order) at the time of displaying each of the plurality of cause parameters on the display section 701 together with the above correspondence.

For example, among cause parameters that need to be displayed on the display section 701, a cause parameter that is considered to have a relatively strong correlation with the symptom is displayed on the display section 701 with priority over a cause parameter that is considered to have a relatively weak correlation. As a result, more important cause parameters can be preferentially displayed, so that the usability can be improved at the time of diagnosing a printing defect.

Further, at least two or more state items are set. Therefore, at least two or more sets of a plurality of cause parameters corresponding to the state items are prepared.

In other words, the correspondence storage section 703*b* according to this embodiment can store a correspondence between a first state item and a plurality of first cause parameters that are candidates for a cause of a printing defect corresponding to the first state item together with a display priority order of the plurality of first cause parameters, and at the same time, store a correspondence between a second state item indicating a different state from the first state item and a plurality of second cause parameters that are candidates for the cause of the printing defect corresponding to the second state item together with a display priority of the plurality of second cause parameters.

Hereinafter, details of the diagnosis support method will be described using a specific example.

(Diagnosis Support Method)

The diagnosis support method is configured as a method for causing the external terminal 700 to execute the above-described diagnosis support program. When this diagnosis support method is started, the respective steps illustrated in FIG. 14 are sequentially executed.

First, in Step S101 of FIG. 14, the display section 701 displays two or more state items indicating states of a printing defect on the workpiece W. Specifically, in Step S01, the display section 701 displays at least the first state item and the second state item indicating a different state from the first state item. As a result, a list of symptoms (state items) of the printing defect is displayed on the display section 701.

FIG. 15A illustrates the selection screen Sc1 displayed on the display section 701. On this selection screen Sc1, a state item B1 indicating a symptom "there is no printing", a state item B2 indicating a symptom "printing is insufficient", a state item B3 indicating a symptom "printing is dark, printing is light, or printing is uneven", a state item B4 indicating a symptom "printing is disturbed", a state item B5 indicating a symptom "printing content is wrong", a state item B6 indicating a symptom "a printing position is misaligned", and a state item B7 indicating a symptom "a printing evaluation value is low (an overall grade, a printing score, or the like is low)" are displayed as the state items.

In the subsequent Step S102, the user selects the symptom of the printing defect occurring in the workpiece W with the receiving section 702. Specifically, in Step S102, the receiving section 702 receives an operation of selecting at least one of the two or more state items displayed on the display section 701. Specifically, in Step S102, the receiving section 702 receives an operation of selecting at least one of two or more state items including the first state item and the second state item. More specifically, in Step S102, the user operates the receiving section 702 to select a state item corresponding to the symptom occurring in the workpiece W from among the state items B1 to B7.

In the example illustrated in FIG. 15A, a desired state item can be selected by clicking any one of the state items B1 to B7 listed on the selection screen Sc1. When a button B8 described as "next" is clicked in the state where the state item has been selected, a display content is switched on the display section 701. Here, a description will continue assuming that the symptom "printing is insufficient" is selected.

In the subsequent Step S103, the control section 704 determines the necessity of displaying each cause parameter and/or the priority order during display based on the symptom (state item) selected in Step S102. Specifically, in Step S103, the control section 704 makes the display priority order of a plurality of cause parameters differ between a case where the first state item is selected through the receiving section 702 and a case where the second state item different from the first state item is selected, based on the state item selected in Step S102 and a stored content in the correspondence storage section 703b. More specifically, the control section 704 makes the display priority order of the respective cause parameters constituting the plurality of first cause parameters different from the display priority order of the respective cause parameters constituting the plurality of second cause parameters. In other words, the control section 704 can change the display order at the time of displaying the respective cause parameters on the display section 701 per state item.

In Step S103, the control section 704 makes a combination of a plurality of cause parameters that need to be displayed on the display section 701 differ between the case where the first state item is selected through the receiving section 702 and the case where the second state item is selected, in addition to or instead of the control of varying the display priority order as described above. More specifically, the control section 704 makes the combination of cause parameters that need to be displayed on the display section 701 at least partially differ among all the cause parameters constituting the plurality of first cause parameters and the plurality of second cause parameters. In other words, the control section 704 can change, for example, the above-described correspondence per state item.

In particular, the control section 704 according to this embodiment is configured to execute both the control for varying the display priority order and the control for varying the configuration of the cause parameters that need to be displayed on the display section 701.

In this manner, the control section 704 according to this embodiment can change the display priority order of the cause parameters corresponding to the state item per state item and change whether to display each cause parameter on the display section 701 (for example, the correspondence) per state item.

FIG. 16 illustrates the respective cause parameters, the correspondences thereof, and the display priority order corresponding thereto. Here, letters "A", "B", and "C" indicate cause parameters to be displayed on the display section 701, and a symbol "x" indicates cause parameters not to be displayed on the display section 701. Further, the letters "A", "B", and "C" indicate a higher display priority order in alphabetical order.

For example, when "printing is disturbed" is selected as the state item, the control section 704 does not display the laser power and the window inspection on the display section 701, but preferentially displays Z tracking and XY tracking. In particular, the control section 704 according to this embodiment preferentially displays a state item classified as the "superficial cause" between the state item classified as the "superficial cause" and a state item classified as the "root cause" on the display section 701. A specific display content will be illustrated in the description of Step S106.

In the subsequent Step S104, the display section 701 displays the pass/fail determination results of printing in a time-series order together with the captured images Pw and the printing scores. Specifically, in Step S104, the display section 701 displays at least one of a first display area Rc1 that displays a plurality of determination results (pass/fail determination results) stored in the history storage section 703a in a time-series order and a second display area Rc2 that displays the captured images Pw respectively corresponding to the plurality of determination results displayed in the first display area Rc1 in a time-series order.

FIG. 15B illustrates an example of the designation screen Sc2 of the date and time of occurrence of the printing defect. As illustrated in the drawing, the display section 701 according to this embodiment can display both the first display area Rc1 and the second display area Rc at the same time. In the example illustrated in FIG. 15B, the first display area Rc1 displays a plurality of vertical bars indicating that the printing sequence has been performed in a time-series order. Among the vertical bars displayed in the first display area Rc, a vertical bar displayed by the alternate long and short dash line indicates a determination result (OK determination result) that printing was favorable and a vertical bar with a mark Mn and displayed by the solid line indicates a determination result (NG determination result) that a printing defect has occurred. In this example, the NG determination is made as the determination result for the penultimate printing sequence executed around 12:00.

In the example illustrated in FIG. 15B, the second display area Rc2 displays the captured images Pw corresponding to the respective determination results in a time-series order from the left side. Here, the captured images Pw generated in the last five printing sequences among the printing sequences performed a plurality of times are displayed. Each of the captured images Pw exemplifies a case where the character string "ABC" is adopted as the printing pattern Pm. Further, the printing score calculated at the time of determining the pass/fail of printing is displayed near the upper right of a display area (square area) of each of the captured images Pw.

Here, among the five captured images Pw, the determination result corresponding to the penultimate captured image Pw is the NG determination as described above. In order to support this determination result, a printing score "46" less than 50 and a character string "NG" indicating the NG determination are displayed in the penultimate captured image Pw. In this manner, the captured image Pw to which the character string "NG" has been attached is associated with the NG determination result. On the other hand, the captured image Pw to which the character string "NG" has not been assigned is associated with the OK determination result.

Here, when any of the determination results in the first display area Rc1 is selected via the receiving section 702, the captured image Pw associated with the selected determination result is also selected in the second display area Rc2. On the contrary, when any of the captured images Pw in the second display area Rc2 is selected, the determination result associated with the selected captured image Pw is also selected in the first display area Rc1.

In this manner, the diagnosis support apparatus according to this embodiment is configured such that an operation input in the first display area Rc1 and an operation input in the second display area Rc2 are linked with each other.

In the example illustrated in FIG. 15B, the first display area Rc1 is arranged above the second display area Rc2. Further, a third display area Rc3 configured to set an extraction period of a determination result in the first display area Rc1 is displayed above the first display area Rc1. When desired numerical values are input in a date and time designation field C1 and a time designation field C2 in the third display area Rc3, the extraction period of the determination result can be set.

A display content in the first display area Rc1 is changed by changing the extraction period of the determination result. The control section 704 can change a display content in the second display area Rc2 so as to be linked with this change. Specifically, the control section 704 changes the display content in the second display area Rc2 so as to display the captured image Pw corresponding to the changed determination result in the first display area Rc1.

Meanwhile, buttons Bb1 and Bb2 configured to change the captured image Pw to be displayed are displayed in the second display area Rc2. For example, when the button Bb1 is clicked, the imaging timing of the captured image Pw to be displayed can be traced back to the past to change the display content in the second display area Rc2. Further, when the button Bb2 is clicked, the imaging timing of the captured image Pw to be displayed can be changed in the opposite direction to the case of clicking the button Bb1. The control section 704 can change the display content in the first display area Rc1 so as to be linked with these changes. Specifically, the control section 704 changes the display content in the first display area Rc1 so as to display the determination result corresponding to the changed captured image Pw in the second display area Rc2.

In this manner, the control section 704 according to this embodiment can control the display section 701 such that the other display content is changed in conjunction with the change of the display content of one of the first display area Rc1 and the second display area Rc2. Note that the display content referred to herein includes a change in display accompanying the selection of the determination result or the captured image Pw.

Meanwhile, the determination result obtained by the pass/fail determination section 105 is illustrated using a display mode of the vertical bar in the first display area Rc in the first display area Rc1 and the second display area Rc2 as described above. However, even if the pass/fail determination section 105 determines that "printing is favorable", a printing defect (printing defect that does not appear in the overall grade and the printing score) is likely to be found when the user visually recognizes the captured image Pw.

Therefore, the receiving section 702 according to this embodiment is configured to receive an operation of correcting the determination result obtained by the pass/fail determination section 105. When the determination result is corrected via the receiving section 702, the control section 704 controls the display section 701 such that the correction via the receiving section 702 is reflected.

Specifically, the receiving section 702 can change the OK determination to the NG determination or the NG determination to the OK determination through a click operation on the captured image Pw in the second display area Rc2 (see FIG. 20). Such a changed content is appropriately reflected in the display modes in the first display area Rc1 and the second display area Rc2.

In the subsequent Step S105, the user selects the pass/fail determination result of printing or the captured image Pw associated with each printing using the receiving section 702. As described above, each determination result and the captured image Pw are grouped in units of printing sequences. Therefore, the date and time of occurrence of the printing defect is designated by selecting the determination result or the captured image Pw (see a thick frame Fn). Specifically, in Step S105, the receiving section 702 receives an operation of selecting one or more of either the NG determination result displayed in the first display area Rc1 or the captured image Pw corresponding to the NG determination result and displayed in the second display area Rc2.

In other words, the receiving section 702 according to this embodiment receives an operation of selecting a plurality of NG determination results or selecting a plurality of captured images Pw. In this case, the date and time of occurrence of the printing defect is designated as a "printing defect occurrence period" that includes the determination results or the captured images Pw selected over a plurality of times.

In the subsequent Step S106, the display section 701 displays the state information of the laser marker L centering on the date and time of occurrence designated by selecting the NG determination results or the captured images Pw in Step S105. Specifically, in Step S106, the control section 704 controls the display section 701 such that at least the state information associated with the NG determination result or the captured image Pw selected via the receiving section 702 is displayed on the display section 701 among a plurality of types of state information (in this embodiment, the above-described plurality of cause parameters). The process related to Step S106 may be started by, for example, clicking a button in which a sentence "start diagnosis" is described, or may be automatically started without such an operation.

When the NG determination result or the captured image Pw is designated by the control section 704 via the receiving section 702, pieces of state information are displayed on the display section 701 in a time-series order for at least one type of the plurality of types of state information. Specifically, when the NG determination results or the captured images Pw are selected over a plurality of times, the control section 704 can display pieces of state information associated with the respective NG determination results or captured images Pw in a time-series order. However, it is difficult for this method to deal with a case where only one NG determination result or one captured image Pw is selected.

Therefore, the display section 801 according to this embodiment can display state information associated with the determination result or captured image Pw other than the selected NG determination result or captured image Pw and state information associated with the selected NG determination result or captured image Pw side by side. Specifically, in Step S106, the control section 704 controls the display section 701 such that the state information associated with determination result other than the NG determination result designated via the receiving section 702 or the state information associated with the captured image Pw other than the captured image Pw designated via the receiving section 702 is displayed on the display section 701 among the plurality of types of state information.

Particularly in this embodiment, the display section 701 displays a plurality of cause parameters as the plurality of types of state information. In this case, the external terminal 700, which is the diagnosis support apparatus, is configured to change the display order of the cause parameters and the necessity of the display according to the symptom of the printing defect as described above.

Specifically, in Step S106, the control section 704 can display the cause parameters on the display section 701 in the display priority order determined in Step S103 or display the cause parameters on the display section 701 based on the combination determined in Step S103.

FIG. 15C illustrates the diagnosis screen Sc3 of the printing defect. This diagnosis screen Sc3 is displayed immediately after switching from the designated screen Sc2, and is a screen configured to diagnose the first cause parameter. On the left side of the diagnosis screen Sc3, a cause list Lt in which a plurality of cause parameters are arrayed from the top according to the display priority order is displayed.

As described above, four cause parameters classified as the "root cause" such as window inspection have a higher display priority order than a plurality of cause parameters classified as the "superficial cause" such as an event log. Further, the display priority order of the cause parameters classified as the "root cause" is determined based on a table illustrated in FIG. 16. As illustrated in FIG. 16, when "printing is insufficient" is selected as the state item, the window inspection is displayed with the highest priority, followed by the laser power and the XY tracking, and followed by the Z tracking.

Specifically, the control section 704 causes the display section 701 to display the cause parameter as the state information based on a storage content in the history storage section 703a. In the example illustrated in FIG. 15C, a change over time of the window inspection, which is the cause parameter that needs to be displayed with the highest priority, is displayed in a graph display area Rc4 arranged at the center of the screen (see the white part in the cause list Lt).

Specifically, in the graph display area Rc4 illustrated in FIG. 15C, a line graph connecting values of each window inspection is displayed in order to illustrate the change over time of the window inspection as the cause parameter. It can be determined that the light-transmissive window 19 is stained more when the window inspection value is small as compared to the case where the window inspection value is large. Further, the mark Mn in the graph display area Rc4 indicates the printing sequence in which the NG determination result has been made as described above. As indicated by the mark Mn, the window inspection value fluctuates greatly in the printing sequence in which the NG determination result has been made as compared to the other timing.

In the subsequent Step S107, the user diagnoses the printing defect based on the change of the cause parameter over time. At that time, the diagnosis support method according to this embodiment can support the diagnosis of the printing defect in an interactive form with the user.

Specifically, an interaction area Rc5 configured for the interaction with the user is displayed above the graph display area Rc4 as illustrated in FIG. 15C. This interaction area Rc5 displays a question that asks whether the change over time of the cause parameter displayed in the graph display area Rc4 exhibits a specific behavior (specifically, the behavior when the displayed cause parameter is abnormal), an item By "yes" which is clicked when it is determined to have the specific behavior, an item Bn "no" which is clicked when it is determined not to have such a behavior, and an item Bi "I don't know" which is clicked when it is difficult to determine whether such a behavior is being exhibited or not.

In other words, the item By "yes" is selected when it is determined that the cause parameter displayed in the graph display area Rc4 triggers the symptom that characterizes the printing defect. The item Bn "no" is selected when it is determined that the cause parameter displayed in the graph display area Rc4 does not trigger the symptom that characterizes the printing defect. The item Bi "I do not know" is selected when it is determined that the cause parameter displayed in the graph display area Rc4 is likely to be related to the symptom that characterizes the printing defect.

In the example in the drawing, the result of the window inspection largely fluctuates at the timing when the NG determination result is made (the timing when the mark Mn is attached). In this case, the user clicks the item By "yes".

The control section 704 repeats Step S106 and Step S107 for all the cause parameters which are determined to be displayed on the display section 701. For example, FIG. 15D illustrates the diagnosis screen Sc4 configured to diagnose the third cause parameter. The diagnosis screen Sc4 illustrates a change over time of Z tracking as a cause parameter whose display priority order is lower than that of the window inspection.

Specifically, a line graph formed by connecting values of the Z tracking (measurement values by the distance measuring unit 5) is displayed in the graph display area Rc4 illustrated in FIG. 15D. In the example illustrated in the drawing, it can be determined that the result of the Z tracking fluctuates greatly in the printing sequence in which the NG determination result is made. Therefore, the user clicks the item By "yes".

In addition, when the symptom of "printing is insufficient" is selected, the control section 704 displays all the four cause parameters classified as the "superficial cause" on the display section 701 (see FIG. 16). When the diagnosis for the cause parameters classified as the "superficial cause" is completed, the control section 704 starts displaying the cause parameters classified as the "root cause" on the display section 701.

For example, FIG. 15E illustrates the diagnosis screen Sc5 configured to diagnose the sixth cause parameter. The diagnosis screen Sc5 illustrates a change over time of the event log (whether occurrence of a specific event is written in the print log Lg).

In the example illustrated in the drawing, a plot indicating NG is displayed in the printing sequence in which the NG determination result is made. Therefore, the user clicks the item By "yes".

Although the line graph connecting the values of each cause parameter is displayed in order to illustrate the change over time of the cause parameter as the state information in the diagnosis screens Sc3 to Sc5 illustrated so far, a display method illustrating the change over time is not limited to the line graph. The change over time of the cause parameter as the state information can be displayed on the display section 701 using at least one of a line graph, a bar graph, and a scatter diagram. Further, the display method may be different for each type of state information.

When diagnosis by the user is completed for all the cause parameters displayed in the cause list Lt, the control section 704 identifies the cause of the printing defect. In the example in the drawing, the values of the window inspection fluctuate greatly as illustrated in FIG. 15C, so that it is determined that the light-transmissive window 19 is stained. As illustrated in FIG. 15D, the values of the Z tracking also fluctuate greatly, so that it is considered that the misalignment of the workpiece W is also the cause. Details of the misalignment, such as whether this misalignment has occurred during printing, can be determined through diagnosis related to other cause parameters. Such identification is executed based on the cause parameter for which the item By "yes" or the item Bi "I do not know" has been selected in the interaction area Rc5.

Thereafter, the user clicks a button Bb3 on which the sentence "display countermeasure" has been displayed. When this button Bb3 is operated, the control process proceeds from Step S107 to Step S108. Note that the operation of clicking the button Bb3 is not essential. Upon completion of the diagnosis by the user, the process may automatically proceed to Step S108.

In Step S108, the display section 701 displays the cause identified in Step S107 and the countermeasure for solving the cause. For example, FIG. 15F illustrates a countermeasure screen Sc6 to display the cause identified through the cause parameter illustrated so far, such as the diagnosis screen Sc3 illustrated in FIG. 15C, and the countermeasure against the cause parameter. As illustrated in FIG. 15F, the countermeasure screen Sc6 illustrates each of the window stain identified as the first cause (cause 1), a countermeasure for solving the stain, the misalignment during printing of the workpiece identified as the second cause (cause 2), and a countermeasure for solving the misalignment.

Thereafter, the user clicks a button Bb4 on which a sentence "output report" has been displayed or a button Bb5 on which a sentence "end diagnosis" has been displayed. When the former button Bb4 is operated, the control process proceeds from Step S108 to Step S109. In this skip S109, a report indicating printing defect diagnosis results, such as the date and time of occurrence of the printing defect, the cause of the printing defect, and the countermeasure for solving the cause, is output.

On the other hand, when the button Bb5 on which the sentence "end diagnosis" has been displayed is operated in Step S108, the control process skips Step S109 and ends.

Note that the operation of clicking the button Bb4 or Bb5 is not essential in Step S108. The report may be automatically output at the same time as the process of displaying the countermeasure screen Sc6, or at a timing before or after the execution of this process.

(Processing when Multiple Symptoms are Selected)

Figure 18:
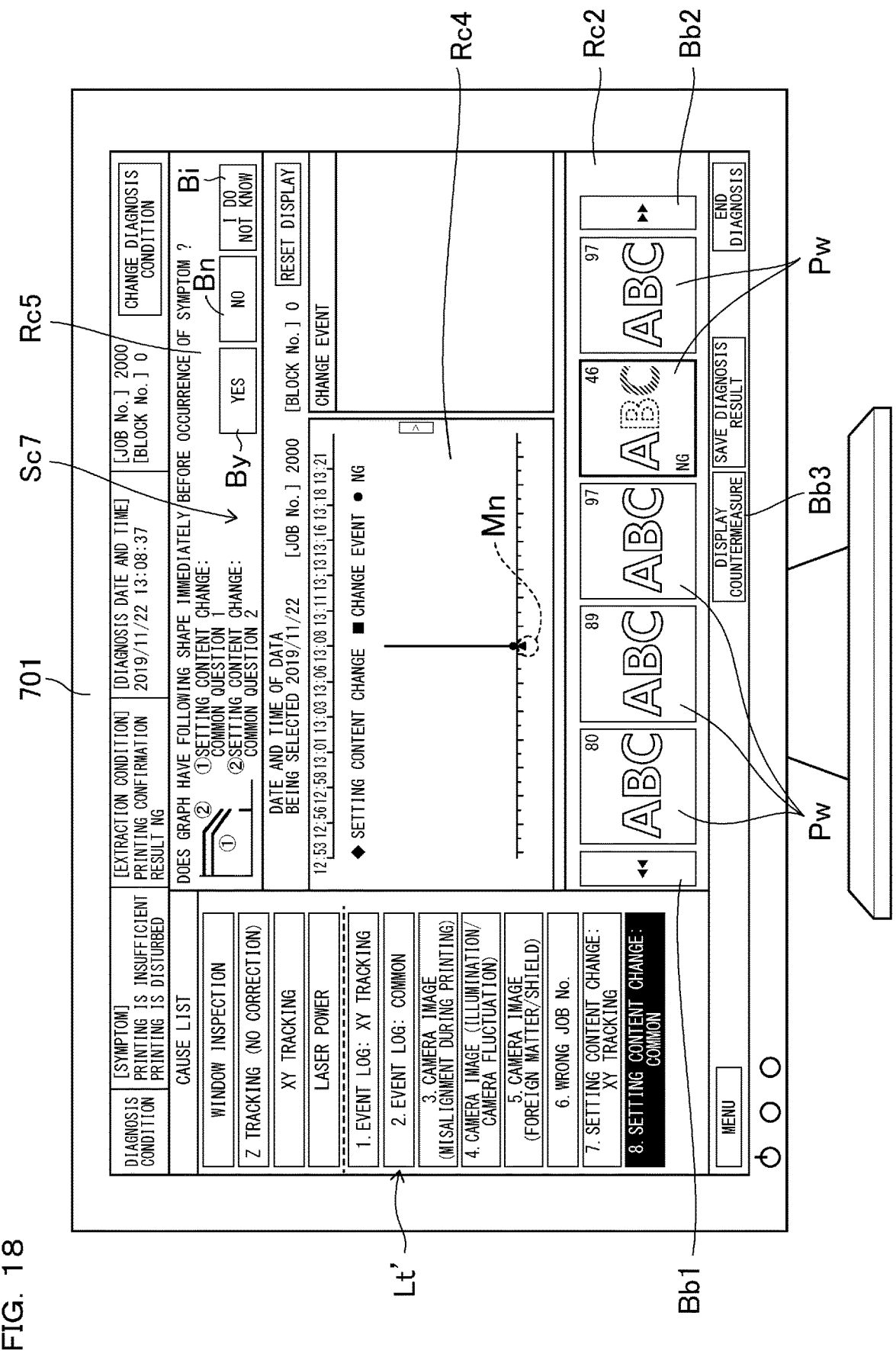
FIG. 18 is a view illustrating a diagnosis screen when the plurality of symptoms are selected.

FIG. 17 is a view illustrating the display priority order when a plurality of symptoms are selected. Further, FIG. 18 is a view illustrating a diagnosis screen Sc7 when the plurality of symptoms are selected.

Although the processing when the symptom "printing is insufficient" is selected, that is, the processing when one state item is selected has been illustrated so far, the diagnosis support method according to the present disclosure is configured to allow the selection of two or more state items. That is, a plurality of state items can be selected from among the state items B1 to B7 on the selection screen Sc1 illustrated in FIG. 15A. Specifically, the receiving section 702 according to this embodiment is configured to be capable of selecting both the first and second state items.

However, when both the first and second state items are selected, there arises a problem on how to configure the display priority order. In order to solve this problem, the control section 704 according to this embodiment is configured to reset the display priority order so as to respect both the display priority order corresponding to the first state item and the display priority order corresponding to the second state item.

Specifically, when both the first and second state items are selected through the receiving section 702, the control section 704 refers to one with a higher order between the display priority order of the plurality of first cause parameters and the display priority order of the plurality of second cause parameters based on the stored content in the correspondence storage section 703b, thereby displaying both the plurality of first and second cause parameters on the display section 701.

That is, when both the first and second state items are selected, both the plurality of first cause parameters which are the cause candidates corresponding to the first state item and the plurality of second cause parameters that are the cause candidates corresponding to the second state item are displayed on the display section 701.

At that time, even if a display priority order of a predetermined parameter (for example, "Z tracking") is low among the cause parameters constituting the plurality of first cause parameters, the display priority order of the predetermined parameter is set to be high if the display priority order of the predetermined parameter is high in a group of the plurality of second cause parameters.

FIG. 17 illustrates processing when the state item B2 illustrating the symptom "printing is insufficient" is selected as the first state item, and the state item B4 illustrating the symptom "printing is disturbed" is selected as the second state item.

As illustrated in the upper part of FIG. 17, the display priority order of Z tracking is set as to be low as "C" among the plurality of first cause parameters corresponding to the first state item (printing is insufficient), and the display priority order of Z tracking is set to be high as "A" among the plurality of second cause parameters corresponding to the second state item (printing is disturbed). In this case, the final display priority order is set to "A" having a higher order as illustrated in the middle part of FIG. 17.

As illustrated in the upper part of FIG. 17, the display priority order of the window inspection is set to be high as "A" among the plurality of first cause parameters, and the window inspection is set as "x" so as not to be displayed on the display section 701 among the plurality of second cause parameters. In this case, the window inspection is set as the cause parameter that needs to be displayed and the display priority order thereof is set to "A" as illustrated in the middle part of FIG. 17.

When such processing is performed for all of the respective cause parameters constituting the plurality of first cause parameters and the respective cause parameters constituting the plurality of second cause parameters, the necessity of final display and the display priority order during display are determined as illustrated in the lower part of FIG. 17.

FIG. 18 illustrates the diagnosis screen Sc7 displayed based on the above determination. As illustrated in the drawing, in a cause list Lt' in the case where "printing is insufficient" and "printing is disturbed" are selected, the cause parameters are displayed side by side in substantially the same order as the lower part of FIG. 17.

(Modification of Diagnosis Screen)

The diagnosis screens Sc3 to Sc6 in the above-described embodiment are provided with the second display area Rc2 that displays the captured image Pw to designate the date and time of occurrence of the printing defect and the graph display area Rc4 that displays the change over time of the cause parameter as the state information, as the information for diagnosis of the printing defect, but the configuration of the diagnosis screen is not limited thereto.

Figure 19:
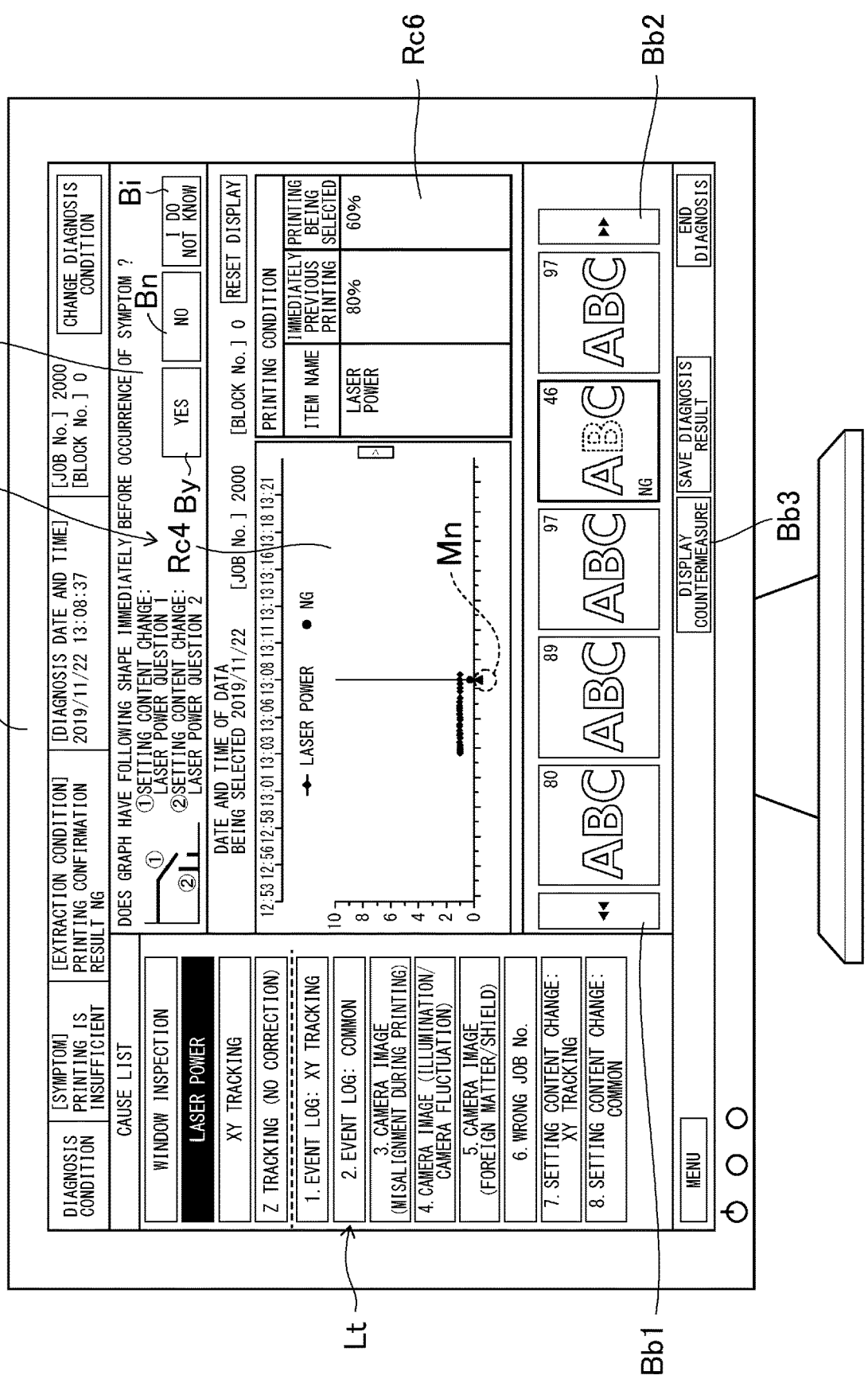
FIG. 19 is a view illustrating a modification of the diagnosis screen.

FIG. 19 is a view illustrating a modification of the diagnosis screen. The diagnosis screen Sc7 according to this modification is further provided with a condition display area Rc6 in addition to areas such as the graph display area Rc4. This condition display area Rc6 is an area configured to display the above-described changes in laser conditions such as laser power, scan speed, and a pulse frequency. It is advantageous in terms of identifying a cause of a printing defect by referring to the condition display area Rc6.

(Regarding Improvement of Usability)

Meanwhile, even if a printing defect is found using the captured image Pw, it is difficult to identify a cause of the printing defect only by visually recognizing the captured image Pw. If the cause is not identified, there is a problem in terms of setting and measures for improving the symptom.

Further, it is required to visually recognize the captured image Pw as appropriate in order for a user to diagnose the printing defect. However, when there are a large number of workpieces W that have undergone printing, there are also a large number of captured images Pw indicating the pass/fail of laser printing, and thus, it becomes difficult to extract a desired captured image Pw.

On the other hand, according to the above-described embodiment, the history storage section 703a stores the NG determination result and the captured image Pw in association with each other, thereby facilitating the extraction of the captured image Pw where the printing defect has occurred. According to the embodiment, an NG determination result or state information associated with a captured image Pw can be displayed by designating the NG determination result displayed on the display section 701 or the captured image Pw corresponding to the NG determination result (see Step S106 in FIG. 14). As a result, a user can visually recognize the state information when printing has not been favorably performed, and the diagnosis of the printing defect can be facilitated. That is, the above-described embodiment contributes to identification of the cause of the printing defect.

In this manner, according to the embodiment, it is possible to facilitate the extraction of a captured image Pw indicating the pass/fail of laser printing and identification of the cause of the printing defect using the captured image Pw, and further, to improve the usability related to the diagnosis of the printing defect.

Further, the display mode of the first display area Rc1 and the display mode of the second display area Rc2 are configured in conjunction with each other as described with reference to FIG. 15B. As a result, it is possible to further improve the usability at the time of diagnosing the printing defect.

Further, it is possible to compare the captured image Pw and the state information regarding the NG determination result with the captured image Pw and the state information regarding the OK determination result as described with reference to FIGS. 15B to 15E and the like. As a result, it is possible to more easily extract the captured image Pw and to more easily identify the cause of the printing defect.

Further, the user can compare the NG determination result or the state information associated with the captured image Pw designated via the receiving section 702 with the determination result other than the designated determination result (for example, the OK determination result) or the state information associated with the captured image Pw as described with reference to FIGS. 15B to 15E and the like. As a result, it is possible to further improve the usability at the time of diagnosing the printing defect.

Further, the user can visually recognize the change over time of the cause parameter as the state information as described with reference to FIGS. 15C to 15E. As a result, it is possible to more easily identify the cause of the printing defect.

Further, the user can easily visually recognize the change over time by displaying the change of the cause parameter over time as the line graph as described with reference to FIGS. 15C to 15E. As a result, it is possible to more easily identify the cause of the printing defect.

Further, as illustrated in FIG. 16, the marking system S according to this embodiment can use the output (laser power) of printing laser light, the distance to the workpiece W (Z tracking), the position of the workpiece W (XY tracking), and the stain on the light-transmissive window 19 (window inspection) as the cause parameters. In this manner, it is possible to more thoroughly identify the cause of the printing defect using a wide variety of information as the cause parameters (state information).

Further, as illustrated in FIG. 20, the determination result can be corrected when the user discovers a printing defect that has been overlooked by the pass/fail determination section 105, and the display content of the display section 701 can be changed to reflect the correction. As a result, it is possible to further improve the usability at the time of diagnosing the printing defect.

OTHER EMBODIMENTS

In the above-described embodiment, the diagnosis support apparatus is configured using the external terminal 700 which is separate or integrated with the operation terminal 800, but the present disclosure is not limited to such a configuration. For example, a diagnosis support apparatus may be configured using the marker controller 100. In this case, the marker controller 100 may implement all the elements constituting the diagnosis support apparatus, or the marker controller 100 may implement only some elements. For example, among the constituent elements of the diagnosis support apparatus, the storage section 703 may be configured using the condition setting storage section 102 of the marker controller 100, and the other constituent elements may be configured using the external terminal 700.

Further, there is a cause parameter that is not displayed on the display section 701 depending on the selected symptom (state item) in the above-described embodiment, but the present disclosure is not limited to such a configuration. For example, all the cause parameters may be displayed on the display section 701 regardless of the selected symptom (state item) after setting the display priority order for all the cause parameters. Alternatively, only the display or non-display on the display section 701 can be set without setting the display priority order for each cause parameter.

Further, the distance measuring unit 5 as the distance measuring mechanism is provided inside the housing 10 in the above-described embodiment, but the present disclosure is not limited to such a configuration. The distance measuring mechanism can also be provided outside the housing 10.

Further, both the coaxial camera 6 and the whole camera 7 as the image acquisition sections are provided inside the housing 10 in the above-described embodiment, but the present disclosure is not limited to such a configuration. For example, the whole camera 7 as the image acquisition section can be provided outside the housing 10.

Further, the diagnosis support method has been described using the flow illustrated in FIG. 14 in the above-described embodiment, but the configuration of the diagnosis support method is not limited to the flow illustrated in FIG. 14. For example, the order of the respective steps may be changed.

Specifically, the display priority order is determined in Step S103 after selection of the symptom in Step S102 in the above-described embodiment, but the present disclosure is not limited to such a configuration. For example, the processes of Step S104, Step S105, and the like may be executed first after execution of the process of Step S102 and before execution of the process of Step S103.

Further, the process proceeds to Step S105 via Step S103 and Step S104 after selection of the symptom in Step S102 and the date and time of occurrence of the printing defect is designated in Step S105 in the above-described embodiment, but the present disclosure is not limited to such a configuration. For example, the process may proceed to Steps S101 and S102 after execution of Steps S104 and S105. With this configuration, the user can select a symptom while referring to the captured image Pw and the determination result.

Further, the configuration of the state information used as the cause parameter is not limited to the example of FIG. 12. Apart of what is described in FIG. 12 may be used, and information which is not described in FIG. 12 may be added. Examples of the information that can be added include the stain on the light-transmissive window 19 (pre-printing window monitor result) detected immediately before printing. When this information is used, the same process as Step S38 in FIG. 11 is performed at any timing of Steps S31 to S34 in FIG. 11. When the pre-printing window monitoring result and the post-print window monitoring result are combined, it becomes possible to diagnose the stain on the light-transmissive window 19 in more detail.

Similarly, regarding the Z tracking as the state information, a measured value before correcting the misalignment in the Z direction may be used as described in Step S32, a measured value after correcting the misalignment may be used, or both the measured values before and after the correction may be used.

Further, the history information is transmitted and received between the marker controller 100 and the external terminal 700 using the print log Lg in the above-described embodiment, but the present disclosure is not limited to such a configuration. The history information may be transmitted and received in real time without using the print log Lg.

Further, the display section 701 is configured to sequentially display the cause parameters one by one in the graph display area Rc4 in the above-described embodiment, but the present disclosure is not limited to such a configuration. For example, the plurality of cause parameters may be displayed at the same time. In this case, for example, the cause parameters may be displayed in order from the top according to the display priority order.

Further, the display section 701 is configured to simultaneously display the first display area Rc1 and the second display area Rc2 when designating the date and time of occurrence of the printing defect in the above-described embodiment, but the present disclosure is not limited to such a configuration. For example, the display section 701 may display one of the first display area Rc1 and the second display area Rc2.

Further, the display section 701 is configured to display both the NG determination result and the OK determination result in the first display area Rc1 in the above-described embodiment, but the present disclosure is not limited to such a configuration. The display section 701 may display at least the NG determination result.

What is claimed is:

1. A marking system comprising:
    a laser marker which includes
    an excitation light generation section that generates excitation light,
    a laser light output section that generates laser light based on the excitation light generated by the excitation light generation section and emits the laser light,
    a laser light scanning section that irradiates a workpiece with the laser light emitted from the laser light output section and two-dimensionally scans a surface of the workpiece; and
    a condition setting storage section that stores printing conditions used for controlling the laser light output section and the laser light scanning section;
    an image acquisition section that captures an image of the workpiece in an area scanned two-dimensionally by the laser light scanning section to generate captured images including at least a part of the workpiece;
    a pass/fail determination section that determines pass/fail of printing applied to the workpiece using the captured images acquired by the image acquisition section;
    a history storage section that stores, as history information in a time-series order, a plurality of determination results including at least an NG determination result among determination results obtained by the pass/fail determination section, the captured images used for acquisition of each of the determination results, and a plurality of pieces of state information at the time of acquisition of each of the determination results among a plurality of types of state information indicating states of the laser marker, in a state of being associated with each other corresponding to each of the determination results;
    a display section that displays at least one of a first display area for displaying the plurality of determination results stored in the history storage section in a time-series order and a second display area for displaying the captured images respectively corresponding to the plurality of determination results in a time-series order;
    a receiving section that receives an operation of selecting one or more of any of the NG determination results displayed in the first display area and the captured image displayed in the second display area and corresponding to the NG determination result; and
    a control section that controls the display section such that at least the state information stored in the history storage section and associated with the NG determination result or the captured image selected via the receiving section is displayed on the display section among the plurality of types of state information.

2. The marking system according to claim 1, wherein
    the display section displays both the first display area and the second display area, and
    the control section controls the display section such that a display content of one of the first display area and the second display area is changed in conjunction with a change of a display content of the other.

3. The marking system according to claim 1, wherein
    the history storage section stores at least a plurality of OK determination results among the determination results obtained by the pass/fail determination section, the captured images used for acquisition of each of the OK determination results, and a plurality of pieces of state information during the acquisition of each of the OK determination results among the plurality of pieces of state information as history information in a time-series order in a state of being associated with each other.

4. The marking system according to claim 1, wherein
    the control section controls the display section such that state information associated with a determination result other than the NG determination result designated via the receiving section among the plurality of types of state information or state information associated with a captured image other than the captured image designated via the receiving section is displayed on the display section.

5. The marking system according to claim 1, wherein the control section displays pieces of state information on the display section in a time-series order regarding at least one type of the plurality of types of state information, associated with the NG determination result or the captured image when the NG determination result or the captured image is designated via the receiving section.

6. The marking system according to claim 1, wherein the control section displays at least one of a line graph, a bar graph, and a scatter diagram illustrating a change over time in the state information on the display section regarding at least one type of the plurality of types of state information when the NG determination result or the captured image is designated via the receiving section.

7. The marking system according to claim 1, further comprising:
a housing that includes at least the laser light output section and the laser light scanning section provided inside;
a power monitor that detects an output of the laser light output from the laser light output section;
a distance measuring mechanism that is provided inside or outside the housing and measures a distance from the housing to the workpiece;
an image processing section that identifies a position of the workpiece when viewed along an area that is two-dimensionally scanned by the laser light scanning section on the captured image generated by the image acquisition section;
a light-transmissive window which is provided in the housing of the laser marker and through which the laser light two-dimensionally scanned by the laser light scanning section passes; and
a stain detection section that detects a stain in the light-transmissive window,
wherein the history storage section stores, as the plurality of types of state information, at least one or more of the output of the laser light detected by the power monitor, the distance to the workpiece measured by the distance measuring mechanism, the position of the workpiece identified by the image processing section, and the stain detected by the stain detection section.

8. The marking system according to claim 1, wherein the receiving section is configured to receive an operation of correcting a determination result obtained by the pass/fail determination section, and
the control section controls the display section such that the correction using the receiving section is reflected.

9. A diagnosis support apparatus that supports diagnosis of a printing defect occurring on a workpiece during printing by a laser marker, which includes:
an excitation light generation section that generates excitation light; a laser light output section that generates laser light based on the excitation light generated by the excitation light generation section and emits the laser light; a laser light scanning section that irradiates a workpiece with the laser light emitted from the laser light output section and two-dimensionally scans a surface of the workpiece; a condition setting storage section that stores printing conditions used for controlling the laser light output section and the laser light scanning section; an image acquisition section that captures an image of the workpiece in an area scanned two-dimensionally by the laser light scanning section to generate captured images including at least a part of the workpiece; and a pass/fail determination section that determines pass/fail of printing applied to the workpiece using the captured images acquired by the image acquisition section,
the diagnosis support apparatus comprising:
a history storage section that stores, as history information in a time-series order, a plurality of determination results including at least an NG determination result among the determination results obtained by the pass/fail determination section, the captured images used for acquisition of each of the determination results, and a plurality of pieces of state information at the time of the acquisition of each of the determination results among a plurality of types of state information indicating states of the laser marker, in a state of being associated with each other corresponding to each of the determination results;
a display section that displays at least one of a first display area for displaying the plurality of determination results stored in the history storage section in a time-series order and a second display area for displaying the captured images respectively corresponding to the plurality of determination results in a time-series order;
a receiving section that receives an operation of selecting one or more of any of the NG determination results displayed in the first display area and the captured image displayed in the second display area and corresponding to the NG determination result; and
a control section that controls the display section such that the state information stored in the history storage section and associated with the NG determination result or the captured image designated via the receiving section is displayed on the display section among the plurality of types of state information.

* * * * *